(12) United States Patent
Choi et al.

(10) Patent No.: US 11,334,152 B2
(45) Date of Patent: May 17, 2022

(54) ELECTRONIC DEVICE AND CONTENT EXECUTING METHOD USING SIGHT-LINE INFORMATION THEREOF

(71) Applicant: Samsung Electronics Co., Ltd., Gyeonggi-do (KR)

(72) Inventors: Seung Hwan Choi, Gyeonggi-do (KR); Hyunjin Kim, Seoul (KR); Da-Hye Park, Gyeonggi-do (KR); Jaeyoung Lee, Gyeonggi-do (KR); Say Jang, Gyeonggi-do (KR); Sang-Woong Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/652,089

(22) PCT Filed: Sep. 13, 2018

(86) PCT No.: PCT/KR2018/010735
§ 371 (c)(1),
(2) Date: Mar. 30, 2020

(87) PCT Pub. No.: WO2019/066323
PCT Pub. Date: Apr. 4, 2019

(65) Prior Publication Data
US 2020/0249750 A1    Aug. 6, 2020

(30) Foreign Application Priority Data
Sep. 29, 2017 (KR) .................. 10-2017-0127918

(51) Int. Cl.
G06F 3/01       (2006.01)
G06F 3/04812   (2022.01)
H04N 21/422    (2011.01)

(52) U.S. Cl.
CPC .......... G06F 3/013 (2013.01); G06F 3/04812 (2013.01); H04N 21/422 (2013.01)

(58) Field of Classification Search
CPC .... G06F 3/013; G06F 3/04812; H04N 21/422
See application file for complete search history.

(56) References Cited

U.S. PATENT DOCUMENTS

| 8,235,529 B1 | 8/2012 | Raffle et al. |
| 2010/0182232 A1 | 7/2010 | Zamoyski |

(Continued)

FOREIGN PATENT DOCUMENTS

| KR | 10-2016-0020571 A | 2/2016 |
| KR | 10-2016-0113139 A | 9/2016 |
| WO | 2014/210151 A1 | 12/2014 |

*Primary Examiner* — Kent W Chang
*Assistant Examiner* — Scott Au
(74) *Attorney, Agent, or Firm* — Cha & Reiter, LLC

(57) ABSTRACT

Various embodiments of the present disclosure relate to an electronic device and a method for executing content by using sight-line information thereof, the electronic device comprising: a display; a sight-line tracking module; a memory storing at least one command; and at least one processor operatively coupled with the display, the sight-line tracking module and the memory. The at least one processor is configured to: on the basis of execution of the at least one command, control the display to display at least one content, and identify one content that a user stares at among the at least one content, based on user's sight-line information tracked through the sight-line tracking module, and in response to a sight-line movement on the identified content being sensed, display, on the display, a dynamic user interface (UI) that is dynamically varied according to the sight-line movement, and in response to a path of the user's sight-line movement satisfying a pre-selected condition, execute the identified content. Other various embodiments are also possible.

18 Claims, 36 Drawing Sheets

(56) References Cited

U.S. PATENT DOCUMENTS

| | | |
|---|---|---|
| 2013/0145304 A1 | 6/2013 | DeLuca et al. |
| 2013/0321265 A1 | 12/2013 | Bychkov et al. |
| 2014/0372957 A1 | 12/2014 | Keane et al. |
| 2015/0205494 A1 | 7/2015 | Scott et al. |
| 2015/0227194 A1* | 8/2015 | Kubota .................. G06F 3/017 |
| | | 345/156 |
| 2015/0268821 A1 | 9/2015 | Ramsby et al. |
| 2016/0077337 A1* | 3/2016 | Raffle .................. G02B 27/017 |
| | | 345/156 |
| 2016/0195924 A1 | 7/2016 | Weber et al. |
| 2016/0231810 A1* | 8/2016 | Imoto ................. G06F 3/04842 |
| 2017/0185146 A1* | 6/2017 | Groh ....................... G06F 3/013 |

* cited by examiner

ELECTRONIC DEVICE AND CONTENT EXECUTING METHOD USING SIGHT-LINE INFORMATION THEREOF

CLAIM OF PRIORITY

This application is a National Phase Entry of PCT International Application No. PCT/KR2018/010735, which was filed on Sep. 13, 2018, and claims a priority to Korean Patent Application No. 10-2017-0127918, which was filed on Sep. 29, 2017, the contents of which are incorporated herein by reference.

TECHNICAL FIELD

Various embodiments of the disclosure relate to a method for executing content by using sight-line information and an electronic device thereof.

Background Art

Electronic devices (e.g., mobile terminals, smart phones, wearable electronic devices, etc.) can provide various functions. For example, the smart phone can provide a short-range wireless communication (e.g., Bluetooth, wireless fidelity (WiFi), near field communication (NFC), etc.), a mobile communication (e.g., 3-generation (3G)), 4G, 5G, etc.), a music or video reproduction function, a photographing function, a navigation function, a messenger function, etc.

Meantime, the electronic devices can include various input interfaces. For example, the electronic devices can include an input device such as a mouse, a track ball, a keyboard, a button key, a touch screen, an electronic pen, and/or the like.

Generally, the electronic devices can execute content according to various inputs of a user. For example, in response to content being double clicked through a mouse or being touched through a touch tool (e.g., a finger, a stylus, an electronic pen, etc.), the electronic devices can execute the corresponding content.

DISCLOSURE OF INVENTION

Technical Problem

In recent years, provided are being electronic devices having a sight-line tracking function of being capable of recognizing a user's sight-line. The electronic device having the sight-line tracking function is providing various functions by using sight-line information. For example, the electronic device does not turn off a screen while a user is looking at the screen, or can execute a corresponding content in response to the user staring at an icon for a specific time or more.

However, a conventional content execution method using sight-line information has an inconvenience that a user has to stare at, during a pre-designated time (e.g., 2 seconds), a content (e.g., an icon, a thumbnail image, etc.) intended to be executed, and is not able to move a sight-line to another location before execution is completed. Also, the conventional content execution method using the sight-line information has an inconvenience that, even in response to the user simply looking at content without an intention of executing the content, the content is executed in response to the lapse of the pre-designated time.

Various embodiments of the disclosure for solving the aforementioned problems may provide an electronic device capable of fast and efficiently executing content by using only sight-line information, and a content execution method using the sight-line information thereof.

Solution to Problem

According to various embodiments of the disclosure, an electronic device may include a display, a sight-line tracking module, a memory storing instructions, and at least one processor operatively coupled with the display, the sight-line tracking module and the memory. The at least one processor may, on the basis of execution of the instructions, be configured to: control the display to display at least one content, and identify a content that a user stares at among the at least one content, based on user's sight-line information tracked through the sight-line tracking module, and in response to a sight-line movement on the identified content being sensed, display, on the display, a dynamic user interface (UI) that is dynamically varied according to the sight-line movement, and in response to a path of the user's sight-line movement satisfying a pre-designated condition, execute the identified content.

According to various embodiments of the disclosure, a method for executing content by using sight-line information of an electronic device, may include displaying at least one content on a display, and identifying a content that a user stares at among the at least one content, and in response to a user's sight-line movement on the identified content being sensed, displaying, on the display, a UI that is dynamically varied according to the sight-line movement, and in response to a path of the user's sight-line movement satisfying a pre-designated condition, execute the identified content.

Advantageous Effects of Invention

Various embodiments of the disclosure may efficiently control the execution of content by using sight-line information. For example, in various embodiments of the disclosure, a user may move a sight-line fast or slowly, to control an execution speed of content.

Also, various embodiments of the disclosure do not immediately cancel a command of execution of content even though the sight-line deviates temporarily and thus, may prevent an inconvenience in which, regardless of a user's intention, the content execution is canceled in response to the sight-line temporarily deviating.

Also, various embodiments of the disclosure may execute content by using only sight-line information and thus, do not require a separate input device.

Also, various embodiments of the disclosure execute the content by a movement of a sight-line and thus, may solve a conventional inconvenience in which the content is executed in response to simply staring at the content without an intention to execute the content.

Also, various embodiments of the disclosure may perform another function according to a movement direction of the sight-line and thus, may easily execute various functions related with content.

BEST MODE FOR CARRYING OUT THE INVENTION

Figure 1:
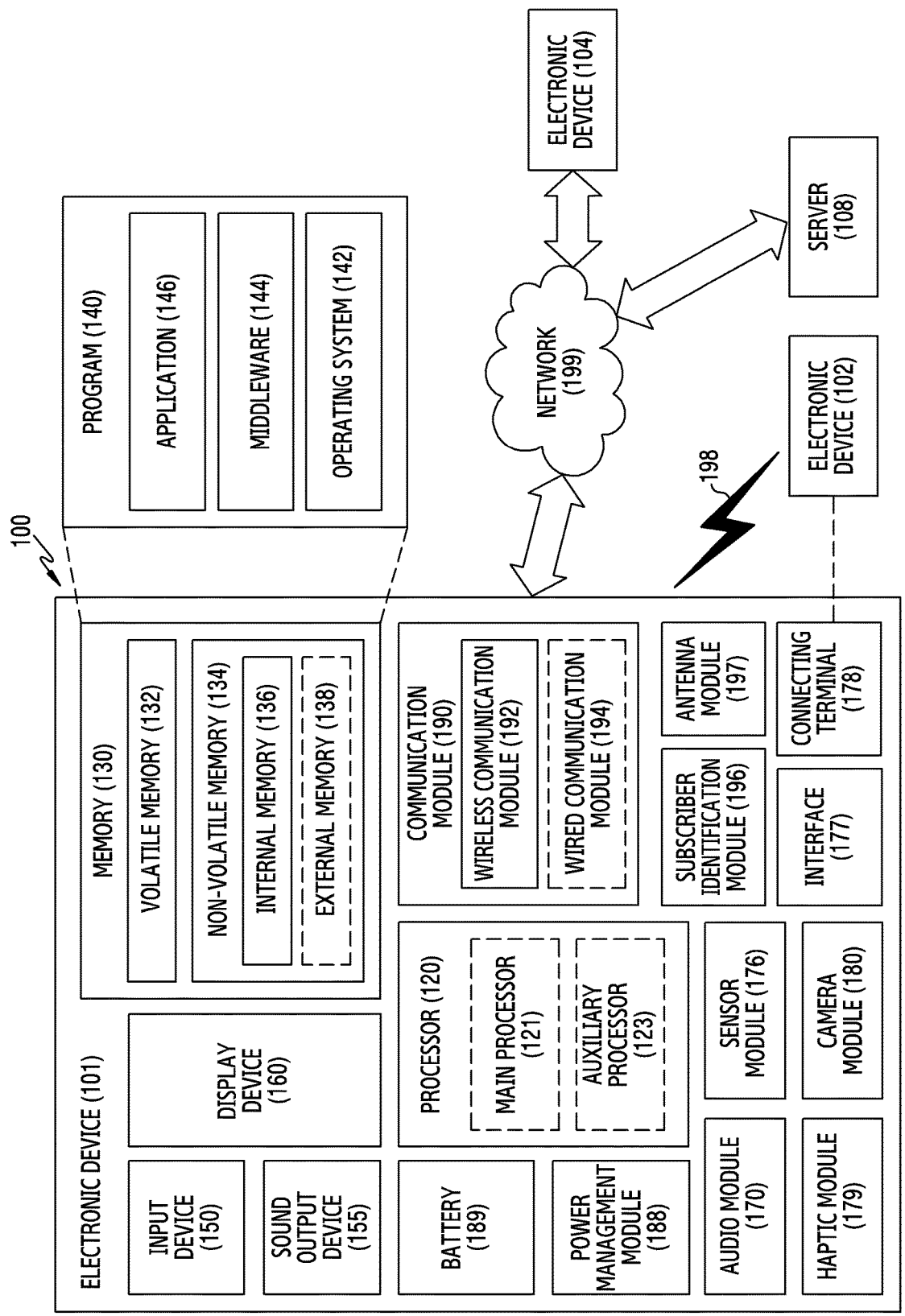
FIG. 1 is a block diagram of an electronic device within a network environment according to various embodiments.

Various embodiments are described below with reference the accompanying drawings. In the present document, specified embodiments are exemplified in the drawings and a related detailed description is mentioned, but this is not intended to limit various embodiments to a specified form. For example, it is obvious to a person having ordinary skill in the art to which the disclosure pertains that embodiments of the disclosure may be modified diversely.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication), or an electronic device 104 or a server 108 via a second network 199 (e.g., a long-range wireless communication). According to an embodiment, the electronic device 101 may communicate with the electronic device 104 via the server 108. According to an embodiment, the electronic device may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or other components may be added in the electronic device 101. In some embodiments, some of the components, for example, may be integrated and implemented such as the sensor module 176 (e.g., a fingerprint sensor, an iris sensor, or an illuminance sensor) embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing and computation. The processor 120 may load and process a command or data received from another component (e.g., the sensor module 176 or the communication module 190) in volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from the main processor 121, may additionally or alternatively consume less power than the main processor 121, or to be specific to a specified function. The auxiliary processor 123 may be implemented as separate from, or embedded in the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to a user of the electronic device 101. The display device 160 may include, for example, a display, a hologram device, or a projector and control circuitry to control a corresponding one of the display, hologram device, and projector. According to an embodiment, the display device 160 may include touch circuitry, or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) wiredly or wirelessly coupled with the electronic device 101.

The sensor module 176 may generate an electrical signal or data value corresponding to an operational state (e.g., power or temperature) of the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support a specified protocol for coupling with the external electronic device (e.g., the electronic device 102) wiredly or wirelessly. According to an embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lense, image sensor, image signal processor, or flash.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a wired communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single chip, or may be implemented as multi chips separate from each other.

The wireless communication module 192 may identify and authenticate the electronic device 101 in a communication network using subscriber information stored in the subscriber identification module 196.

The antenna module 197 may include one or more antennas to transmit or receive a signal or power to or from the outside. According to an embodiment, the communication module 190 (e.g., the wireless communication module 192) may transmit or receive the signal to or from the external electronic device through an antenna appropriate for a communication scheme.

Some of the above-described components may be coupled mutually and communicate signals (e.g., commands or data) therebetween via an inter-peripheral communication scheme (e.g., a bus, general purpose input/output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices. According to an embodiment, if the electronic device 101 should perform a function or a service automatically, or by a request, the electronic device 101, instead of, or in addition to, executing the function or the service, may request at least part associated with the function or the service to external electronic devices. The external electronic devices receiving the request may perform the function requested, or an additional function, and transfer an outcome of the performing to the electronic device 101. The electronic device may provide the outcome, with or without further processing of the outcome. To that end, a cloud computing, distributed computing, or client-server computing technology may be used, for example.

Figure 2:
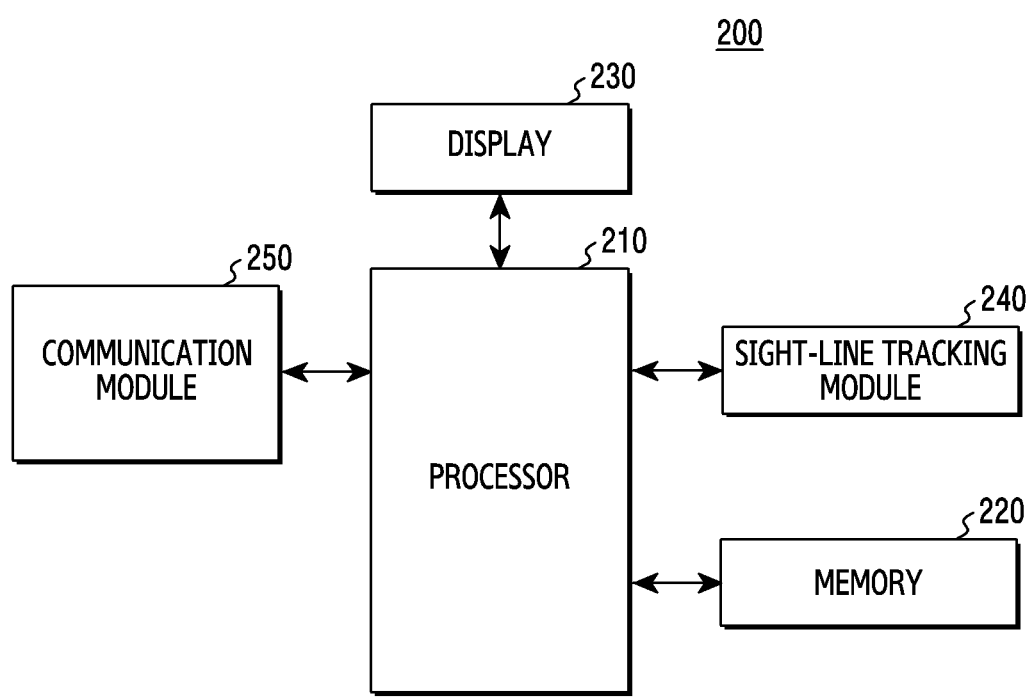
FIG. 2 is a block diagram illustrating a construction of an electronic device according to an embodiment of the disclosure.

FIG. 2 is a block diagram illustrating a construction of an electronic device according to an embodiment of the disclosure.

Prior to the detailed description, the electronic device 200 according to an embodiment of the disclosure may be one of a non-portable electronic device such as a personal computer (PC), a television (TV), etc. capable of tracking a user's sight-line, a portable electronic device such as a smart phone, a tablet PC, a notebook, etc., or a wearable electronic device (e.g., a head mounted device) wearable on a part of the body of a user.

Referring to FIG. 2, the electronic device 200 according to an embodiment of the disclosure may, for example, include the whole or part of the electronic device 101 illustrated in FIG. 1.

The electronic device 200 according to an embodiment of the disclosure may include a processor 210, a memory 220, a display 230, a sight-line tracking module 240, and a communication module 250.

The processor 210 (e.g., the processor 120 of FIG. 1) may control the general operation of the electronic device 200. For example, the processor 210 may control the respective constituent elements of the electronic device 200. The processor 210 may control the respective constituent elements, based on the execution of a command or instructions stored in the memory 220, and perform various functions.

The processor 210 may be formed as a central processing unit (CPU), an application processor (AP), a micro control unit (MCU), a micro processor unit (MPU), etc. The processor 210 may be formed as a single-core processor or a multi-core processor. According to another embodiment, the processor 210 may be a multi processor being consisted to a plurality of processors. For example, the processor 210 may include an application processor (AP) and a communication processor (CP).

The processor 210 according to an embodiment of the disclosure may be operatively coupled with the memory 220, the display 230, the sight-line tracking module 240 and the communication module 250. The processor 210 according to an embodiment of the disclosure may control the execution of content that uses sight-line information. For example, the processor 210 may identify (or recognize) a content that a user stares at among at least one content displayed on the display 230, and may execute the identified content in response to a sight-line movement on the identified content satisfying a selected condition. The processor 210 according to an embodiment of the disclosure may visually feed back, to a user, that a command of execution of the identified content is being inputted until before the content is executed by the sight-line movement (for example, until before the sight-line movement is recognized as a content execution command). For example, the processor 210 may control to display, on the display 230, a dynamic user interface (UI) whose visual attribute (e.g., a size, a transparency, a position, etc.) is dynamically varied according to the sight-line movement.

According to an embodiment of the disclosure, the processor 210 may identify whether an event of cancellation of a content execution command dependent on a sight-line movement takes place. For example, the processor 210 may identify whether a user's sight-line deviates by a given distance or more from a dynamic UI. In response to the sight-line deviating, the processor 210 may visually feed back, that the content execution command is being canceled, by inversely varying the dynamic UI. In response to the user's sight-line re-entering the dynamic UI before the cancellation of the content execution command is completed, the processor 210 may resume an input of the content execution command that uses a user's sight-line movement.

According to an embodiment of the disclosure, in response to a content intended to be executed being identified, the processor 210 may highlight the identified content, and may display, around the identified content, a notification UI notifying that the identified content is in an execution waiting state. Also, the processor 210 may display a guide UI of guiding a sight-line movement path. A detailed description of this will be made later with reference to FIG. 3 to FIG. 6C.

The memory 220 (e.g., the memory 130 of FIG. 1) may be located within a housing of the electronic device 200, and be electrically (or operatively) coupled with the processor 210. The memory 220 may store various programs, and store data provided during the execution of the various programs, data downloaded or the like. The memory 220 may store various commands and/or instructions for operating the processor 210. The memory 220 may include at least any one of an internal memory or an external memory.

The memory 220 according to an embodiment of the disclosure may store a diversity of program codes, commands, instructions or the like of controlling the execution of content that uses sight-line information. The memory may store a condition for recognizing a sight-line movement as a command of execution of the identified content. For example, the memory 220 may store, as the condition, a movement direction of a sight-line, a movement path thereof, a movement speed thereof, a movement time thereof, etc.

The display 230 (e.g., the display device 160 of FIG. 1) may be exposed through a first surface (e.g., front surface) of a housing of the electronic device 200, and provide an output function. For example, the display 230 may be formed as a liquid crystal display (LCD), a light emitting diode (LED) display, an organic light emitting diode (OLED) display, or a microelectromechanical systems (MEMS) display, or an electronic paper display. According to some embodiment, the display 230 may include a touch panel for receiving a user input, and may be formed integrally with the touch panel. The touch panel may, for example, include a first panel (not shown) for sensing a touch that uses a finger, a second panel (not shown) for recognizing an input that uses an electronic pen, and/or a third panel (not shown) for pressure sensing. The display 230 according to various embodiments of the disclosure may display a variety of user interfaces controlling the execution of content that uses sight-line information. A detailed description of this will be made later with reference to FIG. 7A to FIG. 10G.

The sight-line tracking module 240 may track a user's sight-line. For example, the sight-line tracking module 240 may track the sight-line by using an infrared sensor or a camera module (e.g., the camera module 180 of FIG. 1). According to some embodiment, the sight-line tracking module 240 may track the sight-line through head tracking.

The communication module 250 (e.g., the communication module 190 of FIG. 1) may be located within the housing of the electronic device 200, and may perform wired communication and/or wireless communication. For example, the communication module 250 may include at least one wireless (e.g., mobile communication, WiFi, LiFi, Bluetooth or the like) communication circuitry and/or at least one wired (e.g., high definition multimedia interface (HDMI), display port (DP), universal serial bus (USB) or the like) communication circuitry.

According to various embodiments of the disclosure, in response to the electronic device 200 being a virtual reality (VR) device, the communication module 250 may receive data for providing a three-dimensional virtual space from at least one external electronic device under the control of the processor 210.

Meantime, although not illustrated in FIG. 2, the electronic device 200 may not include some of the explained constituent elements, or may further include at least one or more other constituent elements (e.g., a digital broadcasting module, a fingerprint scanning module, an audio processing module, a sensor module, etc.) of levels equivalent to those of the explained constituent elements.

Figure 3:
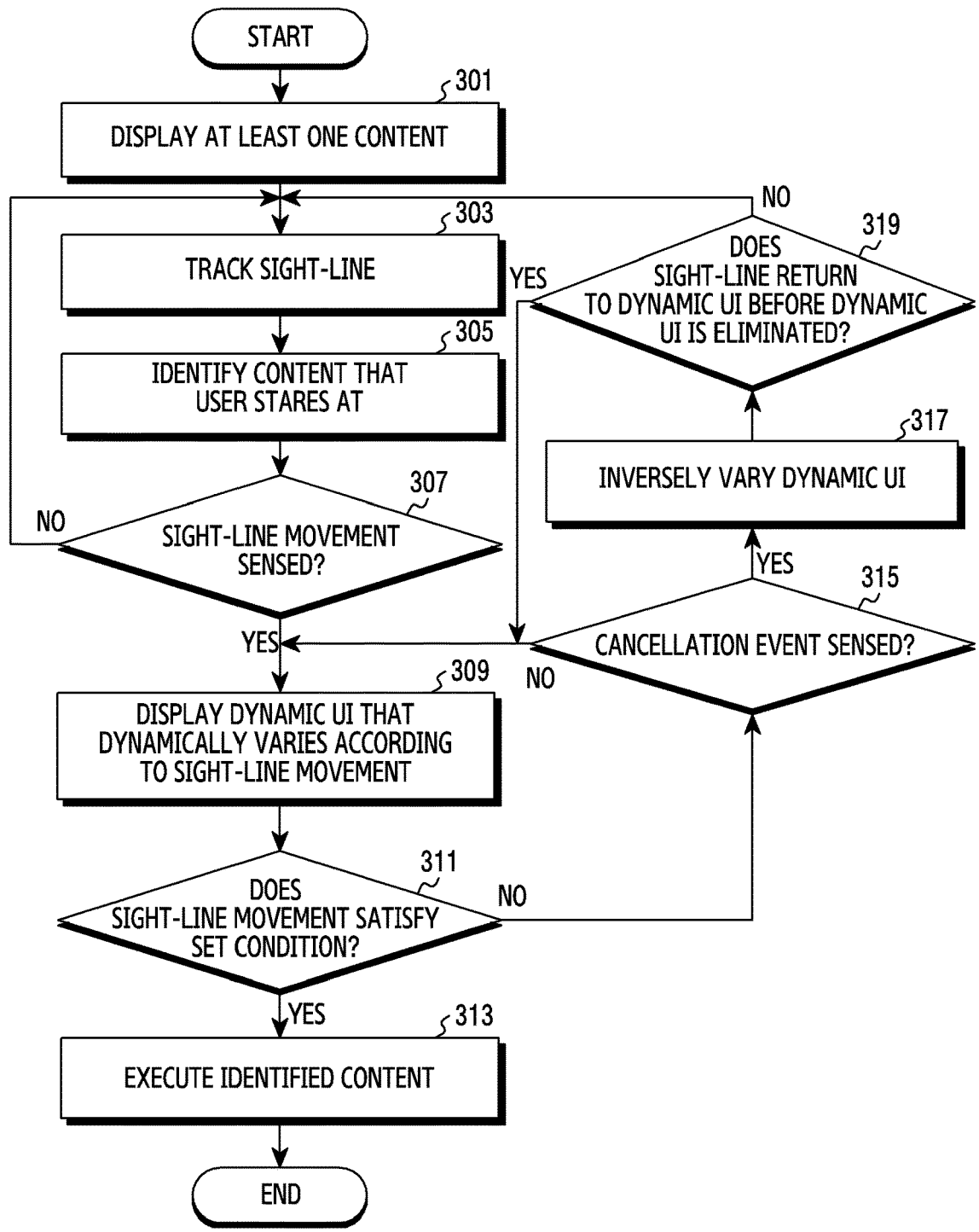
FIG. 3 is a flowchart explaining a method for executing content by using sight-line information of an electronic device according to an embodiment of the disclosure.

FIG. 3 is a flowchart explaining a method for executing content by using sight-line information of an electronic device according to an embodiment of the disclosure. FIG.

Figure 4A:
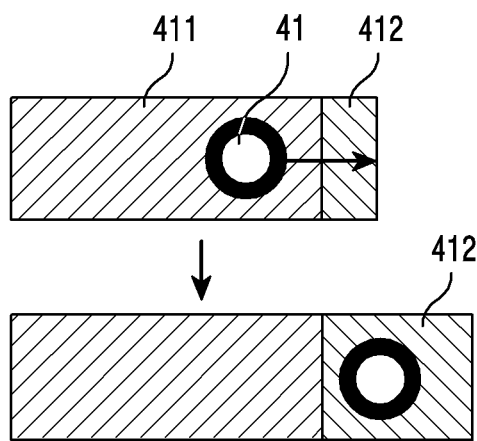
FIG. 4A to FIG. 4E are diagrams explaining a variation of a dynamic UI dependent on a sight-line movement of an electronic device according to an embodiment of the disclosure.
Figure 4B:
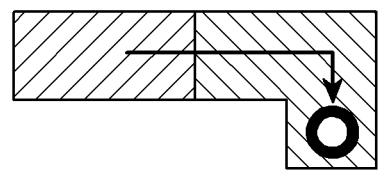
Figure 4C:
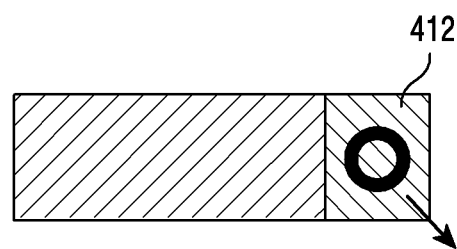
Figure 4D:
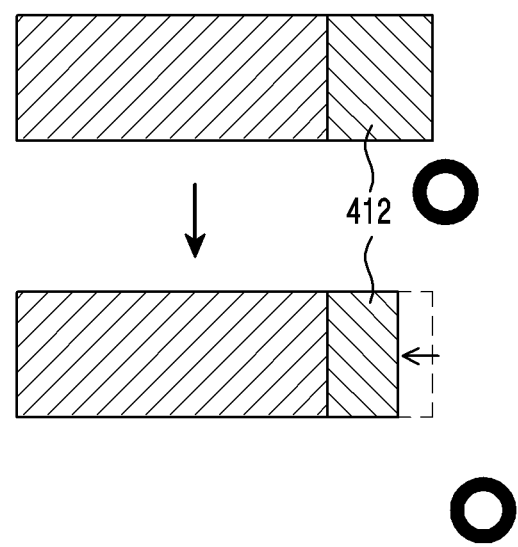
Figure 4E:
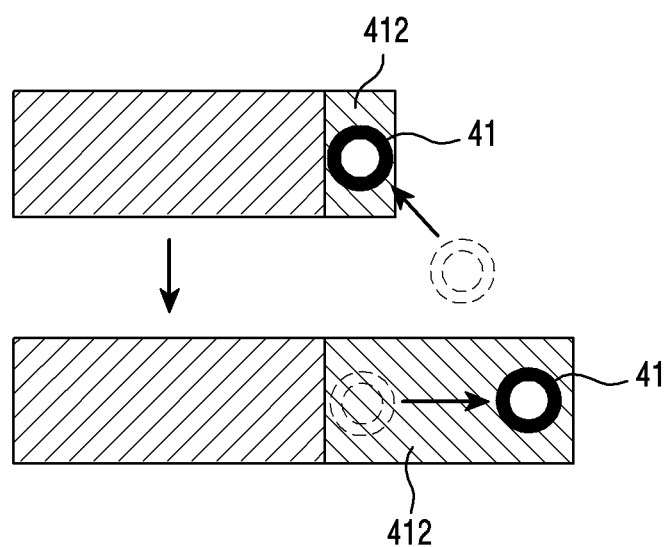

4A to FIG. 4E are diagrams explaining a variation of a dynamic UI dependent on a sight-line movement of the electronic device according to the embodiment of the disclosure.

Referring to FIG. 3 to FIG. 4E, in operation 301, a processor (e.g., the processor 120 of FIG. 1 or the processor 210 of FIG. 2) of the electronic device (e.g., the electronic device 101 of FIG. 1 or the electronic device 200 of FIG. 2) according to an embodiment of the disclosure may display at least one content on a display (e.g., the display device 160 of FIG. 1 or the display 230 of FIG. 2).

In operation 303, the processor according to an embodiment of the disclosure may track a sight-line. For example, the processor may track a user's sight-line through a sight-line tracking module (e.g., the sight-line tracking module 240) such as an infrared sensor, a camera, a head tracking module, etc.

In operation 305, the processor according to an embodiment of the disclosure may identify a content that a user stares at. For example, the processor may identify whether the user's sight-line moves to a content (hereinafter, a specified content) among the at least one content displayed on the display, and identify whether the sight-line stays on the specified content for a specific time (e.g., 0.5 seconds) or more.

In operation 307, the processor according to an embodiment of the disclosure may identify whether a sight-line movement on the identified content is sensed. For example, the processor may identify whether the sight-line is moved in a set direction (e.g., on the right of the content). According to some embodiment, the processor may identify whether the sight-line is moved to a set position (e.g., to the right corner of the content). According to some embodiment, the processor may identify whether the sight-line is moved in the set direction and/or to the set position within a set time. According to some embodiment, the processor may identify whether the sight-line is moved in the set direction and/or to the set position at a speed of a set range. According to some embodiment, the processor may identify whether the sight-line is moved in the set direction and/or to the set position at a speed equal to or less than a set reference value and/or exceeding the set reference value.

In response to the sight-line movement not being sensed as the identifying result of operation 307, the processor may go to operation 303 and repeat the aforementioned operations. On the other hand, in response to the sight-line movement being sensed as the identifying result of operation 307, the processor may, in operation 309, display a dynamic UI which dynamically varies according to the sight-line movement. For example, as shown in FIG. 4A, in response to a sight-line 41 located on a content 411 being moved to the right, the processor may display a dynamic UI 412 on the right of the content 411, and vary a visual attribute of the dynamic UI 412 according to the movement of the sight-line 41. For example, the processor may control a display to extend the dynamic UI 412 in a horizontal direction, in response to the movement of the sight-line 41. In FIG. 4A, the dynamic UI 412 is illustrated in a bar shape of dynamically extending to the right, but embodiments of the disclosure are not limited to this. For example, the dynamic UI 412 may have various forms such as a circle, an oval, a triangle, etc., and get bigger gradually in response to the sight-line movement. Or, the dynamic UI 412 may be a thumbnail image or preview image of content, and the thumbnail image or preview image may get bigger gradually in response to the sight-line movement. According to some embodiment, the dynamic UI 412 may have a transparency which is variable in response to the sight-line movement. According to some embodiment, the electronic device may move a position of the identified content (or a virtual content corresponding to the identified content) in response to the sight-line movement, without displaying a separate dynamic UI.

In operation 311, the processor according to an embodiment of the disclosure may identify whether the sight-line movement satisfies a set (or given) condition. The condition may include a movement direction, a movement distance, a movement speed, a movement path, and/or the like. For example, in response to the sight-line moving a set distance or more in a set direction, the processor may identify that the sight-line movement satisfies the condition. According to another embodiment, as illustrated in FIG. 4B, in response to a path of the sight-line movement being matched with a set path (e.g., ' 1'-shape path), the processor may identify that the sight-line movement satisfies the condition.

In response to the sight-line movement satisfying the condition as the identifying result of operation 311, the processor according to an embodiment of the disclosure may, in operation 313, execute the content.

On the other hand, in response to the sight-line movement not satisfying the condition as the identifying result of operation 311, the processor according to an embodiment of the disclosure may, in operation 315, identify whether an event of cancellation of an execution command is sensed (or takes place). For example, as illustrated in FIG. 4C, the processor may identify whether the user's sight-line deviates from the dynamic UI 412.

In response to the cancellation event not being sensed as the identifying result of operation 315, the processor may return to operation 309. On the other hand, in response to the cancellation event being sensed as the identifying result of operation 315, the processor may, in operation 317, inversely vary the dynamic UI. This is to feed back, to a user, that an input of the execution command is being cancelled. For example, as illustrated in FIG. 4D, the processor may decrease a size of the dynamic UI 412 to the left. The size decrease of the dynamic UI 412 may be performed at a set speed.

In operation 319, the processor according to an embodiment of the disclosure may identify whether the sight-line returns to the dynamic UI before the dynamic UI is eliminated. In response to the sight-line returning to the dynamic UI as the identifying result of operation 319, the processor may return to operation 309 and repeat the aforementioned operations. For example, as illustrated in FIG. 4E, in response to the sight-line returning to the dynamic UI before the dynamic UI 412 is eliminated, the processor may resume the displaying of the dynamic UI 412 dependent on the sight-line movement.

On the other hand, in response to the sight-line not returning to the dynamic UI as the identifying result of operation 319, the processor may return to operation 303 and perform the aforementioned operations.

According to some embodiment, the electronic device may provide a menu of turning On/Off a function of executing content by using sight-line information (hereinafter, a sight-line execution function). In response to the sight-line execution function being On (or being activated), the electronic device may perform the method of FIG. 3 described above.

Figure 5:
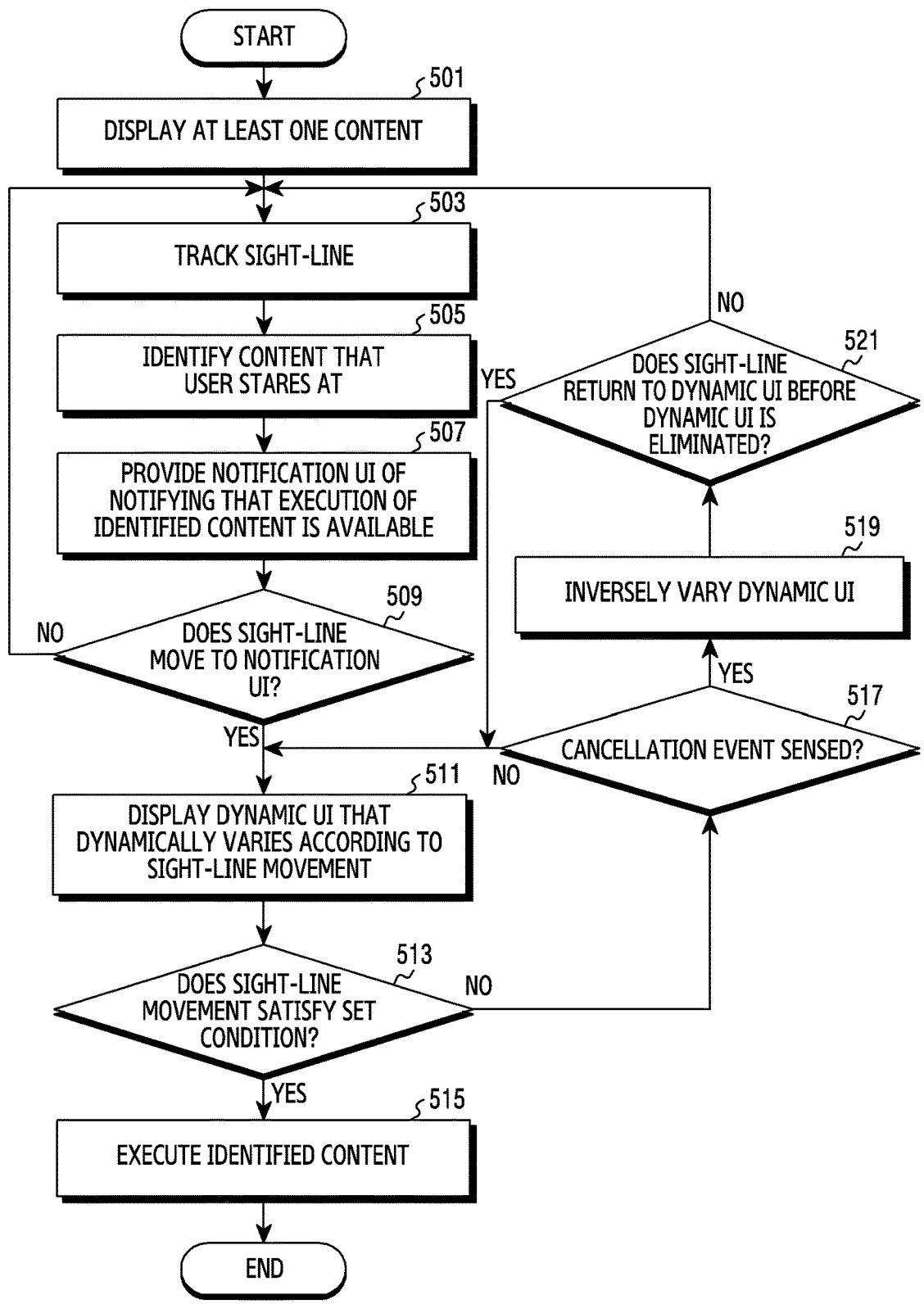
FIG. 5 is a flowchart explaining a method for executing content by using sight-line information of an electronic device according to an embodiment of the disclosure.
Figure 6A:
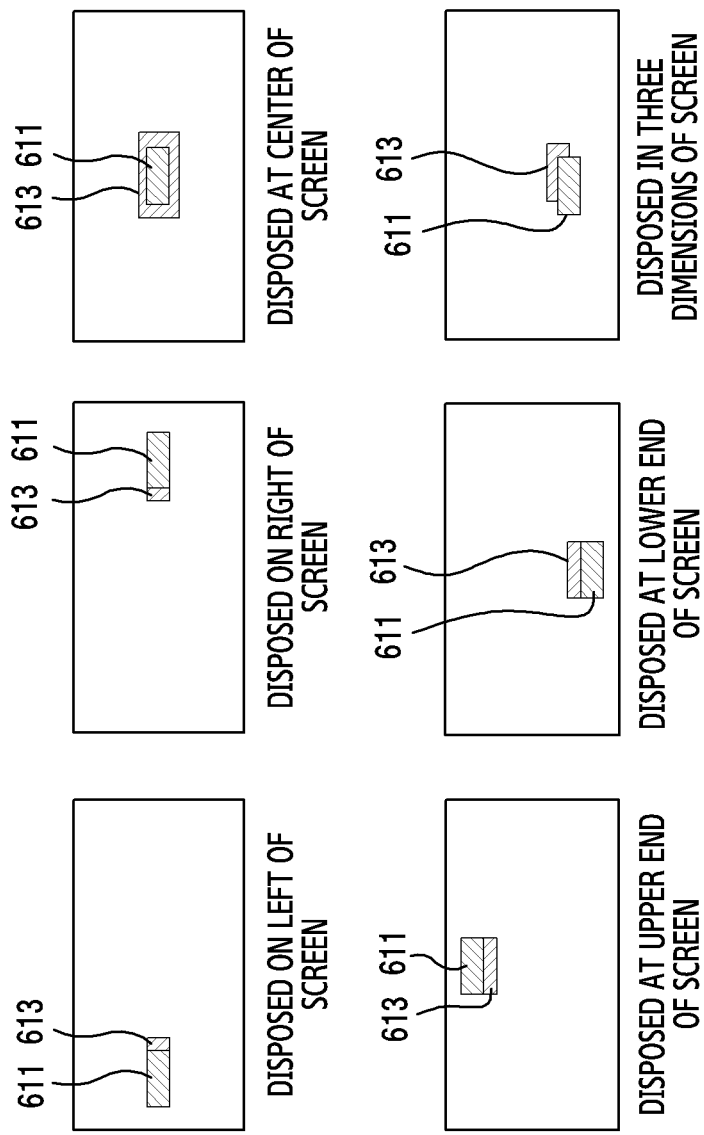
FIG. 6A and FIG. 6B are diagrams explaining a display position of a notification UI notifying an execution waiting state of content according to an embodiment of the disclosure.
Figure 6B:
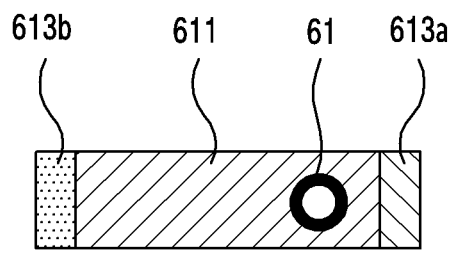
Figure 6C:
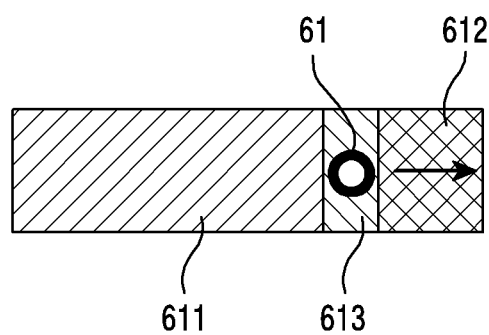
FIG. 6C is a diagram explaining a variation of a dynamic UI dependent on a sight-line movement of an electronic device according to an embodiment of the disclosure.

FIG. 5 is a flowchart explaining a method for executing content by using sight-line information of an electronic device according to an embodiment of the disclosure. FIG. 6A and FIG. 6B are diagrams explaining a display position of a notification UI notifying an execution waiting state of content according to an embodiment of the disclosure. FIG. 6C is a diagram explaining a variation of a dynamic UI dependent on a sight-line movement of the electronic device according to an embodiment of the disclosure.

Referring to FIG. 5 to FIG. 6C, in operation 501, a processor (e.g., the processor 120 of FIG. 1 or the processor 210 of FIG. 2) of the electronic device (e.g., the electronic device 101 of FIG. 1 or the electronic device 200 of FIG. 2) according to an embodiment of the disclosure may display at least one content on a display (e.g., the display device 160 of FIG. 1 or the display 230 of FIG. 2).

In operation 503, the processor according to an embodiment of the disclosure may track a sight-line. For example, the processor may track a user's sight-line through a sight-line tracking module (e.g., the sight-line tracking module 240) such as an infrared sensor, a camera, a head tracking module, etc.

In operation 505, the processor according to an embodiment of the disclosure may identify a content that a user stares at. For example, the processor may identify whether the user's sight-line moves to a specified content among the at least one content displayed on the display, and may identify whether the sight-line stays on the specified content for a specific time (e.g., 0.5 seconds) or more.

In operation 507, the processor according to an embodiment of the disclosure may display a notification UI of visually feeding back that the identified content is in an execution waiting state. For example, as illustrated in FIG. 6A, the processor may display a notification UI 613 around a content 611. A display position of the notification UI 613 may be changed according to a relative position (hereinafter, disposition) of the content 611 on a screen. For example, in response to the content 611 being disposed on the left of the screen, the notification UI 613 may be displayed on the right of the content 611. In response to the content 611 being disposed on the right of the screen, the notification UI 613 may be displayed on the left of the content 611. In response to the content 611 being disposed at a center of the screen, the notification UI may be displayed to surround the content 611. In response to the content 611 being disposed at an upper end of the screen, the notification UI 613 may be displayed at a lower end of the content 611. In response to the content 611 being disposed at a lower end of the screen, the notification UI 613 may be displayed at an upper end of the content 611. According to some embodiment, the notification UI 613 may be displayed in tree dimensions. For example, the notification UI 613 may be displayed in rear (or front) of the content 611.

According to some embodiment, the notification UI 613 may be plural in number. For example, as illustrated in FIG. 6B, a first notification UI 613a may be displayed on the right of the content 611, and a second notification UI 613b may be displayed on the left of the content 611. This is merely an example, and does not limit an embodiment of the disclosure. For example, the first notification UI 613a and the second notification UI 613b may be displayed at an upper side and lower side of the content 611, respectively. Or, the first notification UI 613a and the second notification UI 613b may be displayed at a left side and upper side of the content 611, respectively. Or, the first notification UI 613a and the second notification UI 613b may be disposed side by side in a horizontal direction at the upper side of the content 611. In another example, three or more notification UIs may be displayed around the content 611.

In operation 509, the processor according to an embodiment of the disclosure may identify whether the sight-line is moved to the notification UI.

In response to the sight-line not being moved to the notification UI as the identifying result of operation 509, the processor may go to operation 503 and repeat the aforementioned operations. On the other hand, in response to it being identified that the sight-line is moved to the notification UI as the identifying result of operation 509, in operation 511, the processor may display a dynamic UI which dynamically varies according to a sight-line movement. For example, in response to sensing that a user's sight-line 61 is moved to the notification UI 613, as illustrated in FIG. 6C, the electronic device may display a dynamic UI 612 at a side of the notification UI 613, and vary the dynamic UI 612 in response to the movement of the sight-line 61 (e.g., extend a size of the dynamic UI 612 in a movement direction of the sight-line 61). On the other hand, FIG. 6C distinguishes and shows the notification UI 613 and the dynamic UI 612, but an embodiment of the disclosure is not limited to this. For example, according to some embodiment, the processor may extend the notification UI 613 to use the extended notification UI 613 as the dynamic UI 612, without separately displaying the dynamic UI 612.

In operation 513, the processor according to an embodiment of the disclosure may identify whether the sight-line movement satisfies a set (or given) condition. The condition may include a movement direction, a movement distance, a movement speed, a movement path, and/or the like. In response to the sight-line movement satisfying the condition as the identifying result of operation 513, in operation 515, the processor according to an embodiment of the disclosure may execute the identified content.

On the other hand, in response to the sight-line movement not satisfying the condition as the identifying result of operation 513, in operation 517, the processor according to an embodiment of the disclosure may identify whether an event of cancellation of an execution command is sensed (or occurs). For example, the processor may identify whether the user's sight-line deviates from the dynamic UI 612.

In response to the cancellation event not being sensed as the identifying result of operation 517, the processor may return to operation 511. On the other hand, in response to the cancellation event being sensed as the identifying result of operation 517, in operation 519, the processor may inversely vary the dynamic UI. For example, the processor may decrease a size of the dynamic UI 612 at a specific speed.

In operation 521, the processor according to an embodiment of the disclosure may identify whether the sight-line returns to the dynamic UI before the dynamic UI is eliminated. In response to the sight-line returning to the dynamic UI as the identifying result of operation 521, the processor may return to operation 511 and repeat the aforementioned operations. On the other hand, in response to the sight-line not returning to the dynamic UI until the dynamic UI is eliminated as the identifying result of operation 521, the processor may return to operation 503 and perform the aforementioned operations.

FIG. 7A to FIG. 7H are example diagrams executing a file by using sight-line information of an electronic device according to an embodiment of the disclosure.

Figure 7A:
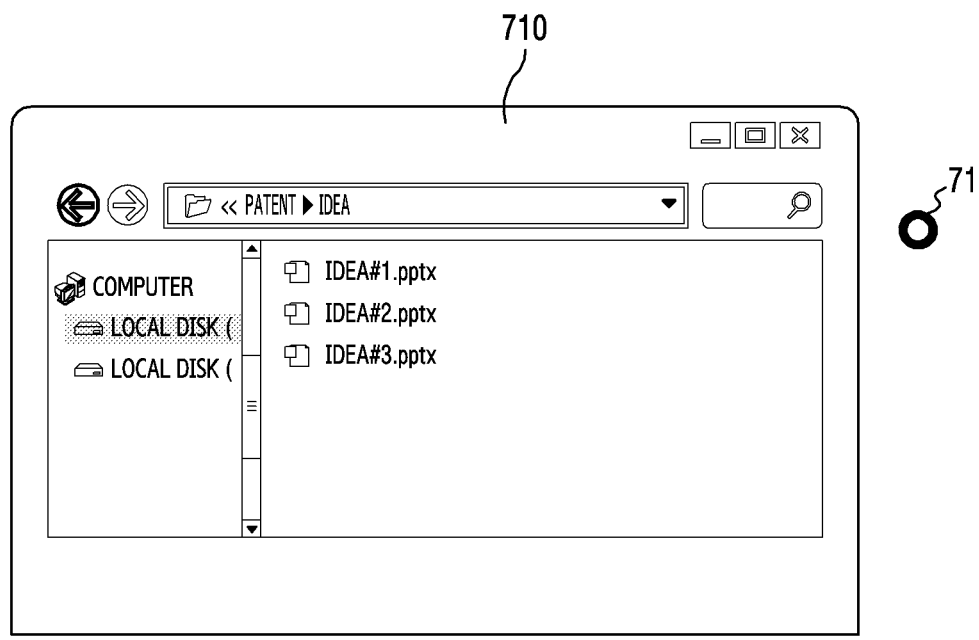
FIG. 7A to FIG. 7H are example diagrams executing a file by using sight-line information of an electronic device according to an embodiment of the disclosure.

Referring to FIG. 7A to FIG. 7H, the electronic device (e.g., the electronic device 101 of FIG. 1 or the electronic device 200 of FIG. 2) according to an embodiment of the disclosure may execute a stored file by using sight-line information. For example, as shown in FIG. 7A, the electronic device may output an explorer 710 displaying a list of at least one file stored in a memory (e.g., the memory 130 of FIG. 1 or the memory 220 of FIG. 2) at one side of a display (e.g., the display device 160 of FIG. 1 or the display 230 of FIG. 2).

Figure 7B:
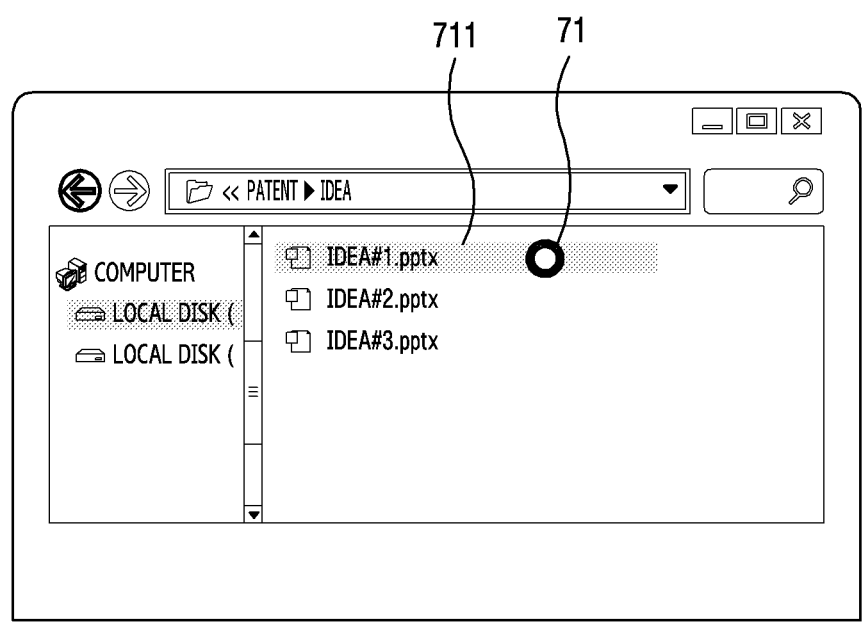

The electronic device according to an embodiment of the disclosure may recognize a sight-line movement through a sight-line tracking module (e.g., the sight-line tracking module 240 of FIG. 2). As shown in FIG. 7B, in response to it being identified that a user's sight-line 71 faces a specified file 711, the electronic device may highlight the specified file 711.

Figure 7C:
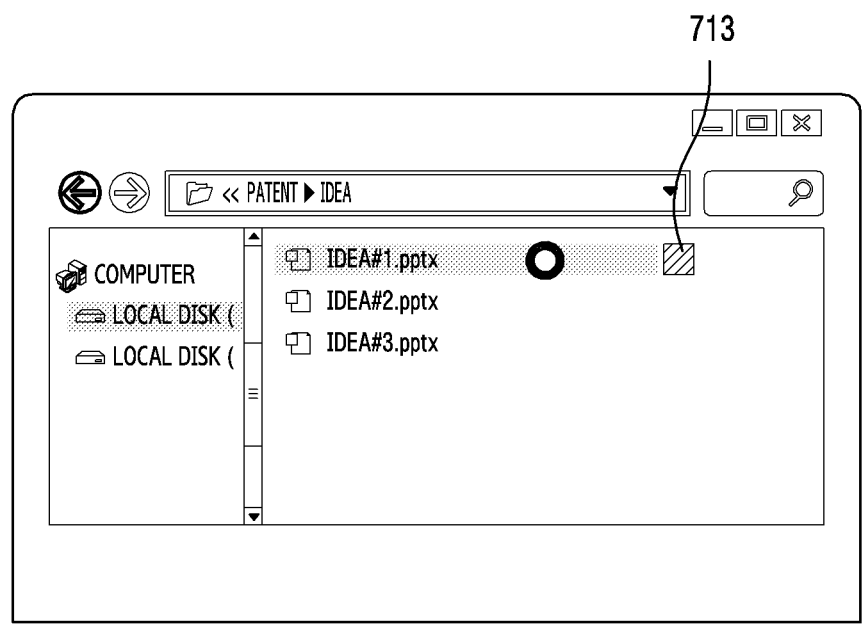

In response to the user's sight-line 71 staying on the specified file 711 for a specific time (e.g., 0.5 seconds) or more, the electronic device according to an embodiment of the disclosure may identify that a user intends to execute the specified file 711, and as shown in FIG. 7C, may display a notification UI 713 of feeding back that the specified file 711 is in an execution waiting state, on the right of the specified file 711.

Figure 7D:
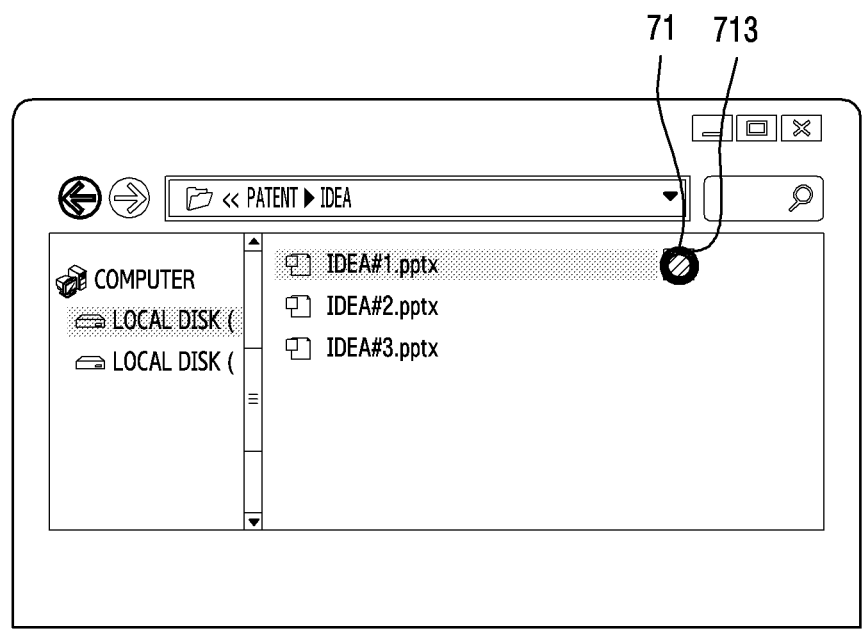
Figure 7E:
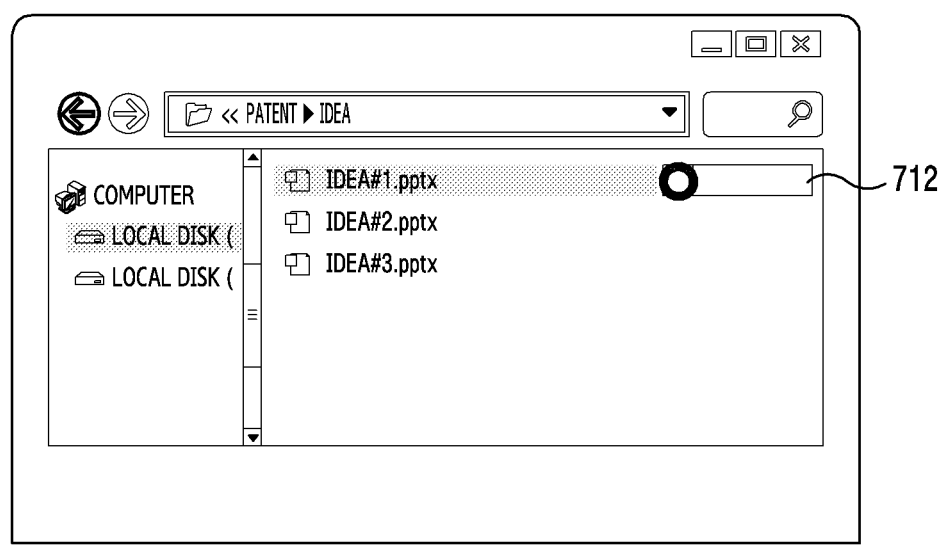

As shown in FIG. 7D and FIG. 7E, in response to the user's sight-line being moved to the notification UI 713, the electronic device according to an embodiment of the disclosure may display a guide UI 712. The guide UI 712 may guide a movement extent and movement path of the sight-line 71 for content execution, to the user. The electronic device may change a background color of the guide UI 712 according to a movement of the sight-line 71, to feed back the movement extent of the sight-line 71. According to some embodiment, the electronic device may display the movement extent of the sight-line 71 in a text form (e.g., xx %). According to some embodiment, the operation of FIG. 7E providing the guide UI 712 may be omitted.

Figure 7F:
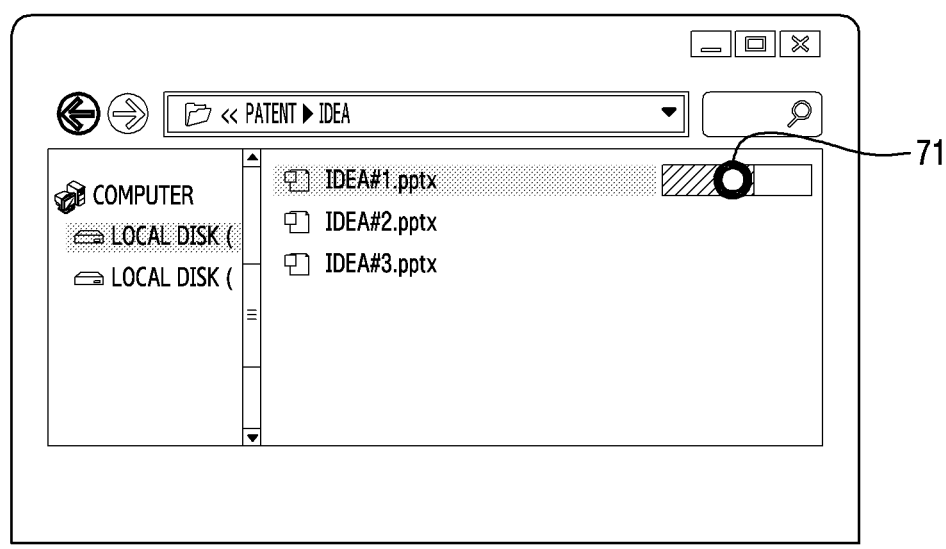
Figure 7G:
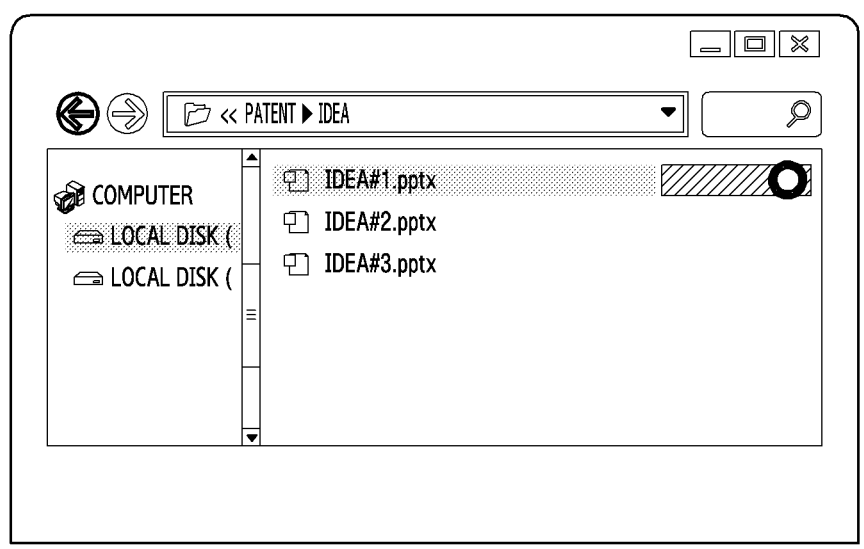

In response to the user moving the sight-line along the guide UI 712, as shown in FIG. 7F and FIG. 7G the electronic device according to an embodiment of the disclosure may change a color of the guide UI 712 in response to the movement of the sight-line 71.

Figure 7H:
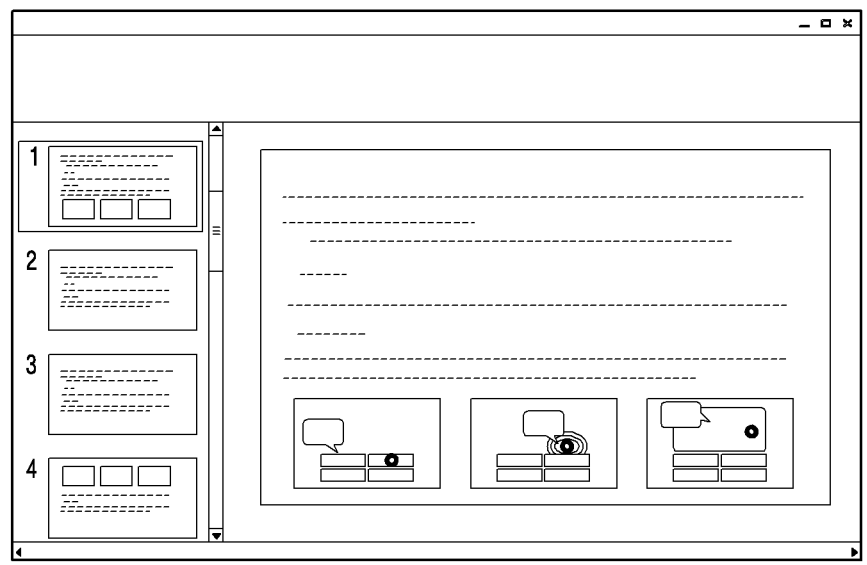

In response to the movement of the sight-line 71 satisfying a set condition (e.g., the sight-line 71 being moved to the right edge of the guide UI 712), as shown in FIG. 7H, the electronic device according to an embodiment of the disclosure may execute the specified file 711, and output an execution screen on the display.

FIG. 8A to FIG. 8F are example diagrams executing an image by using sight-line information of an electronic device according to an embodiment of the disclosure.

Referring to FIG. 8A to FIG. 8F, the electronic device (e.g., the electronic device 101 of FIG. 1 or the electronic device 200 of FIG. 2) according to an embodiment of the disclosure may execute an image (e.g., a photo) by using sight-line information.

Figure 8A:
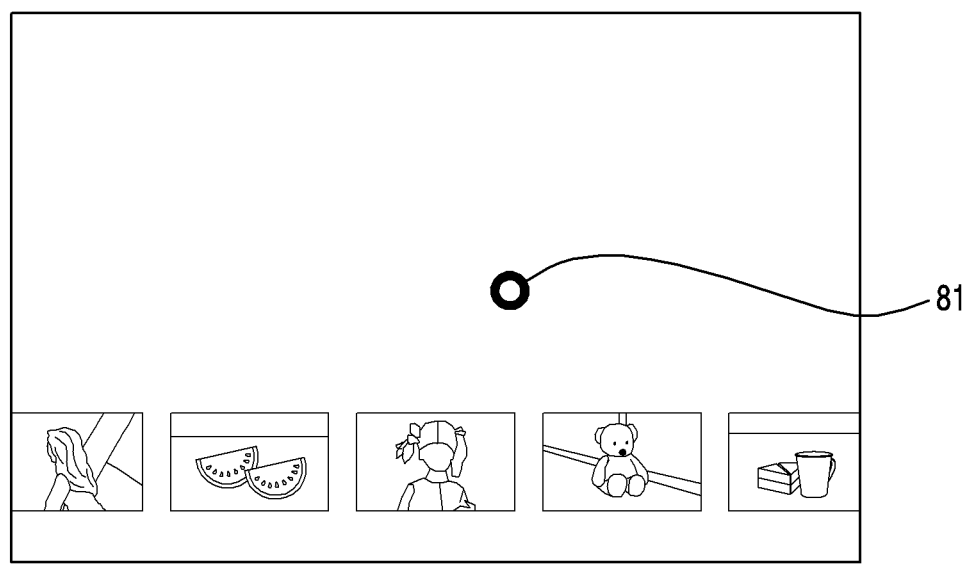
FIG. 8A to FIG. 8F are example diagrams executing an image by using sight-line information of an electronic device according to an embodiment of the disclosure.

As shown in FIG. 8A, the electronic device according to an embodiment of the disclosure may output a list of images stored in a memory (e.g., the memory 130 of FIG. 1 or the memory 220 of FIG. 2) in a thumbnail form at one side (e.g., a lower end) of a display (e.g., the display device 160 of FIG. 1 or the display 230 of FIG. 2).

Figure 8B:
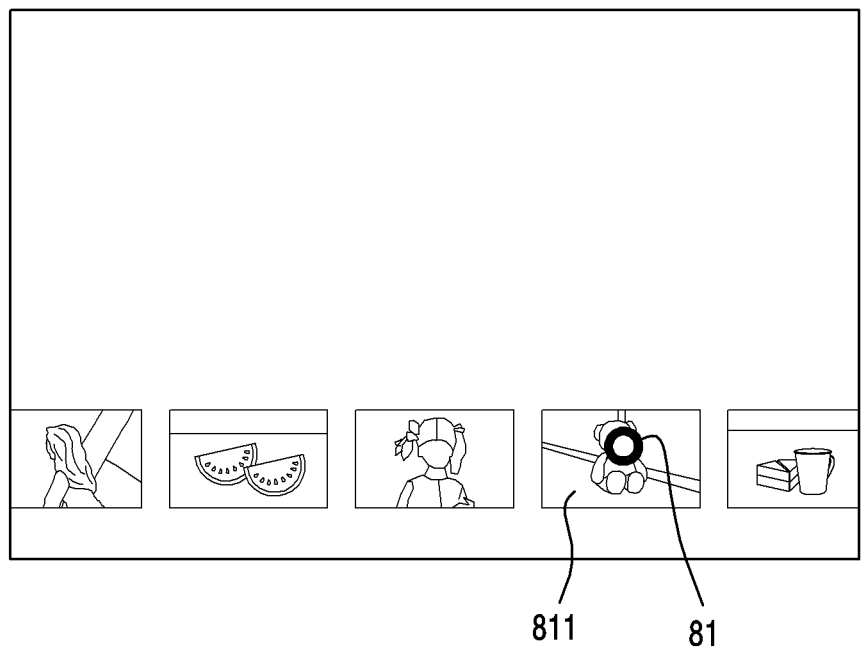

In response to a user moving a sight-line 81 to a specified image 811, as shown in FIG. 8B, the electronic device according to an embodiment of the disclosure may sense that the user's sight-line 81 has been moved to the specified image 811 through a sight-line tracking module (e.g., the sight-line tracking module 240 of FIG. 2). According to some embodiment, the electronic device may highlight the specified image 811 in order to feed back that the sight-line has been moved to the specified image 811.

Figure 8C:
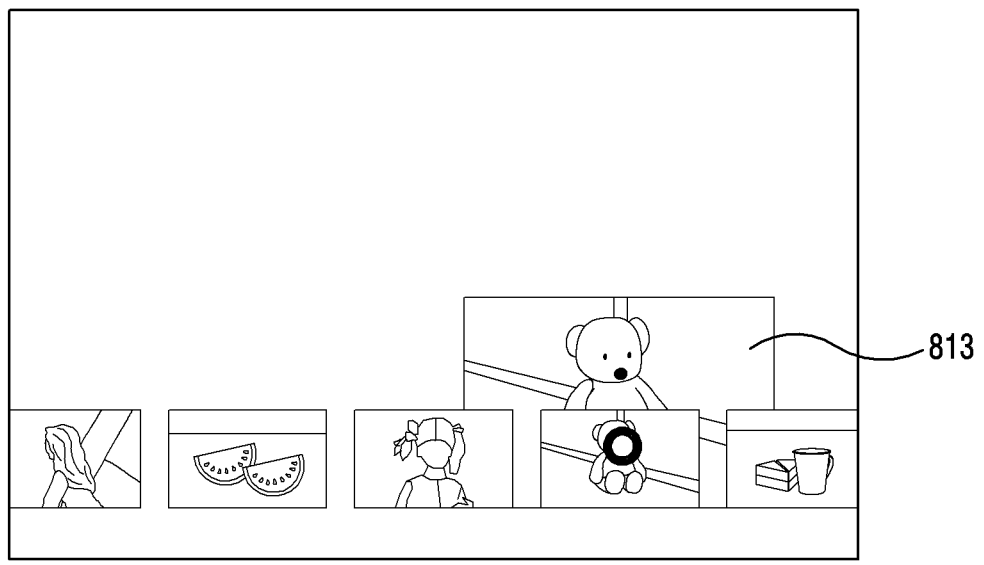

In response to the sight-line staying on the specified image 811 for a specific time or more, the electronic device according to an embodiment of the disclosure may identify that the user intends to execute the specified image 811, and thus display a dynamic UI 813. For example, as shown in FIG. 8C, the electronic device may provide, as the dynamic UI 813, an image which is semitransparent (e.g., a transparency of 50%) and gets bigger than the specified image 811 by a set size (or rate). Through this, the electronic device according to various embodiments of the disclosure may feed back, to the user, that the specified image 811 is in a state of being executable through a sight-line movement (i.e., an execution waiting state).

Figure 8D:
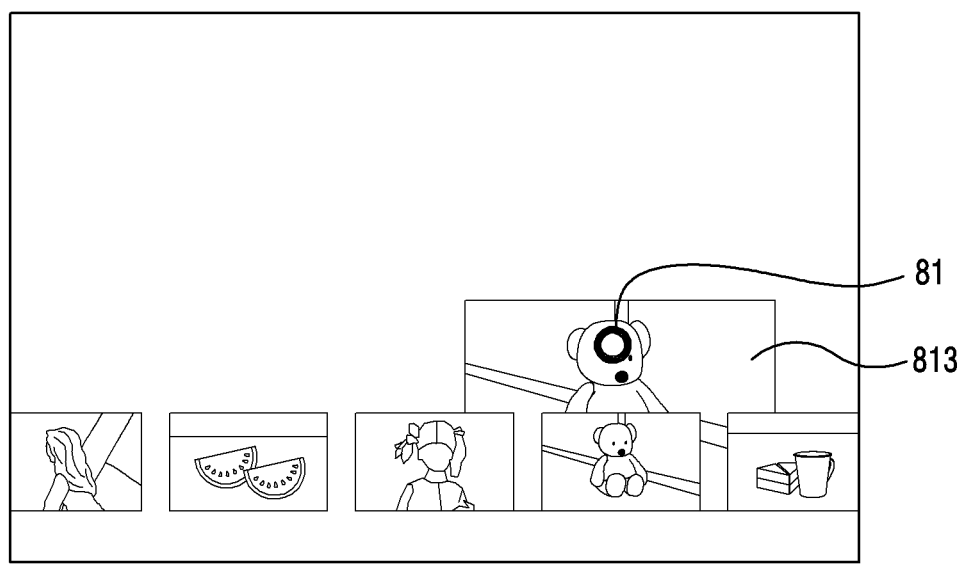
Figure 8E:
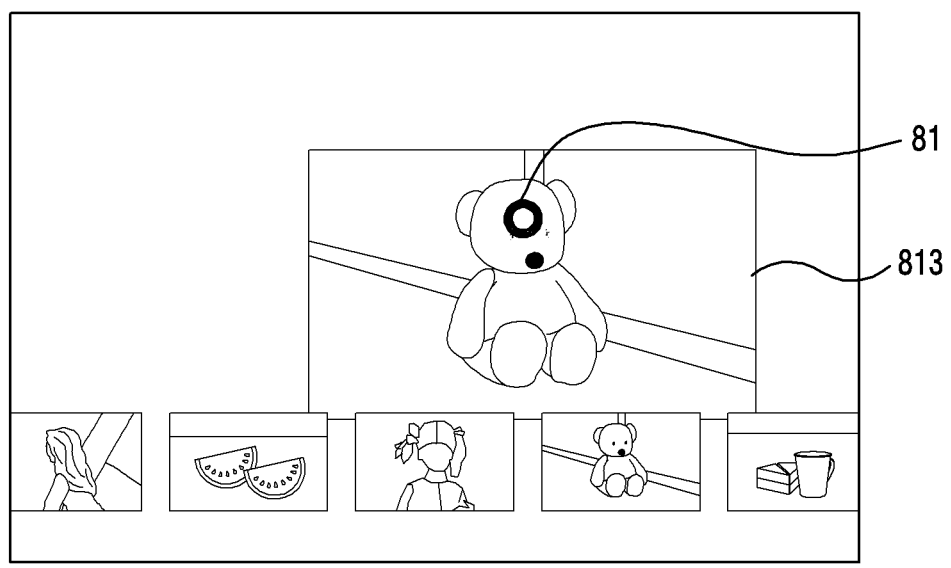

As shown in FIG. 8D and FIG. 8E, the electronic device according to an embodiment of the disclosure may vary the dynamic UI 813 in response to the movement of the sight-line 81. For example, the electronic device may increase a size of the dynamic UI 813 in response to the sight-line movement. According to some embodiment, the electronic device may sequentially decrease a transparency of the dynamic UI 813 in response to the sight-line movement.

According to some embodiment, the electronic device may display reference information (e.g., a reference UI) for identifying that an input of an execution command of the specified image 811 is completed. For example, the reference UI may be displayed in a dotted-line square box form which has a size of a specific rate (e.g., 70%) of an execution screen of the specified image 811. This is merely an example, and does not limit an embodiment of the disclosure, and the reference information may be provided in various forms.

Figure 8F:
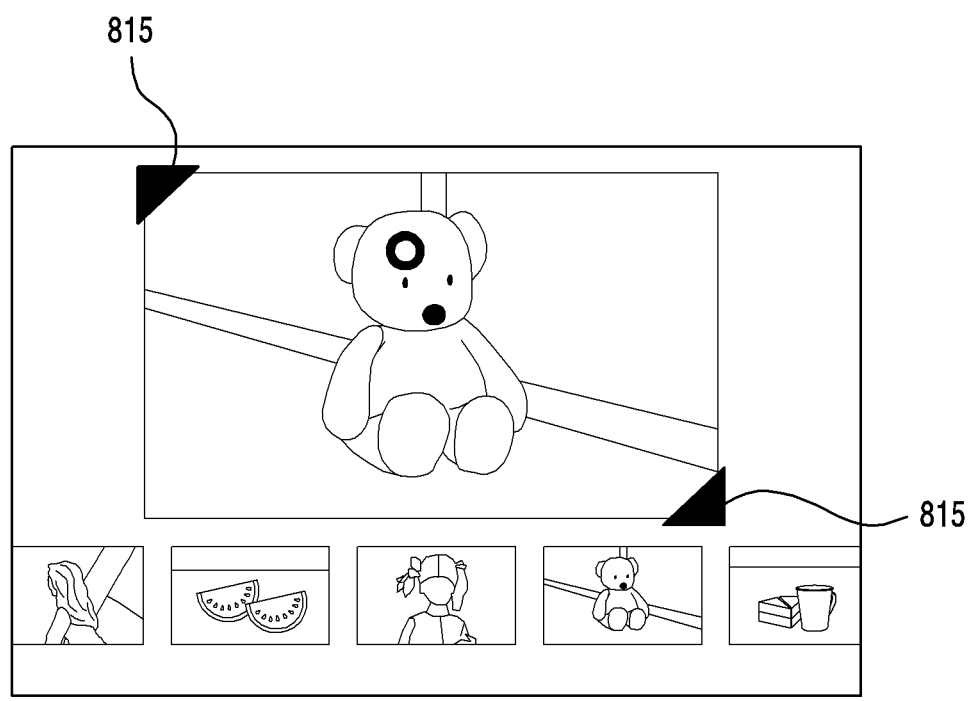

In response to the movement of the sight-line 81 satisfying a set condition, as shown in FIG. 8F, the electronic device according to an embodiment of the disclosure may execute the specified image 811. According to some embodiment, the electronic device may visually feed back that the execution has been completed. For example, as shown in FIG. 8F, the electronic device may display a mark 815 around the executed image 811. This is merely an example, and does not limit an embodiment of the disclosure, and the electronic device may provide a feedback on the execution completion in various schemes (e.g., sight, hearing and/or touch).

Figure 9A:
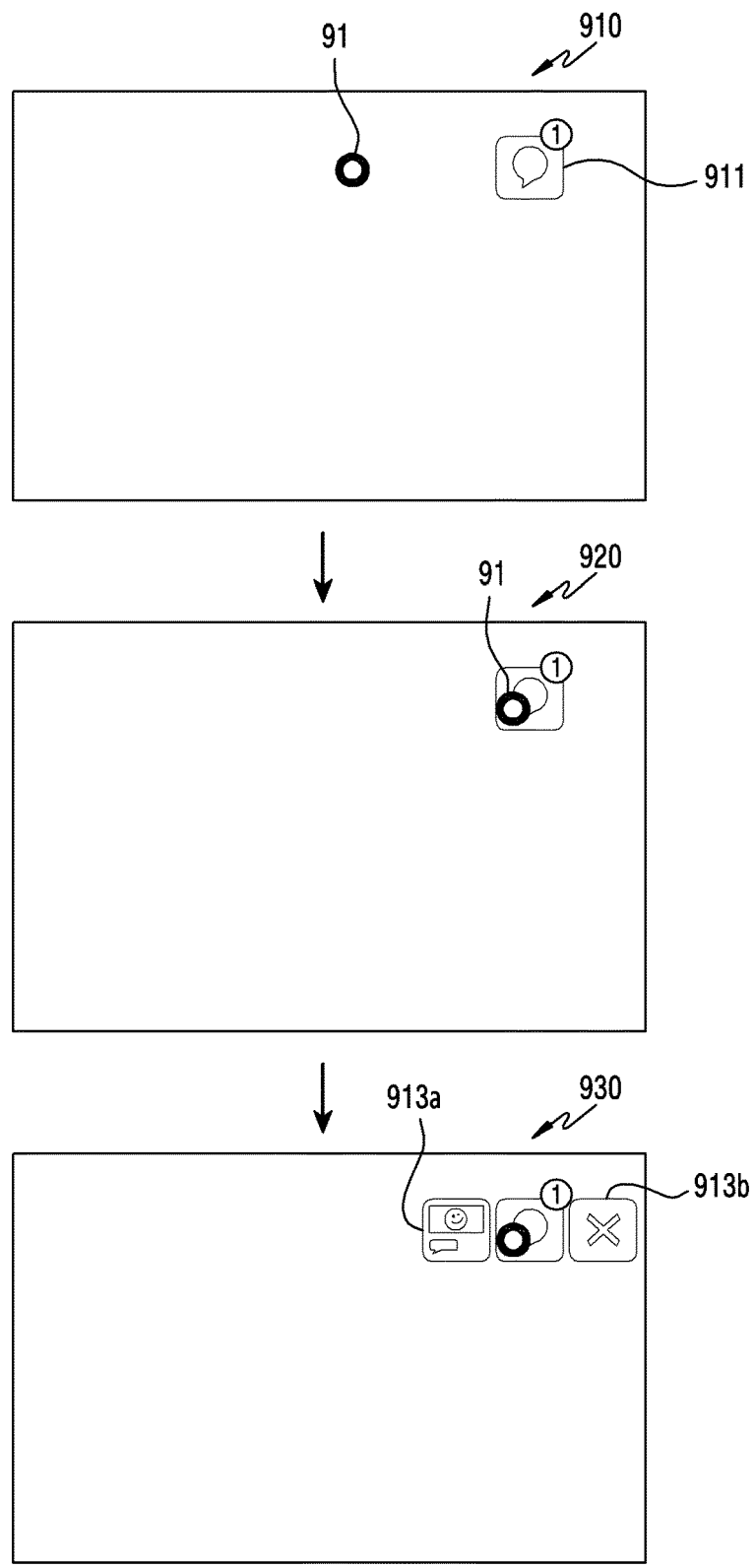
FIG. 9A to FIG. 9C are example diagrams executing an application by using sight-line direction information of an electronic device according to an embodiment of the disclosure.
Figure 9B:
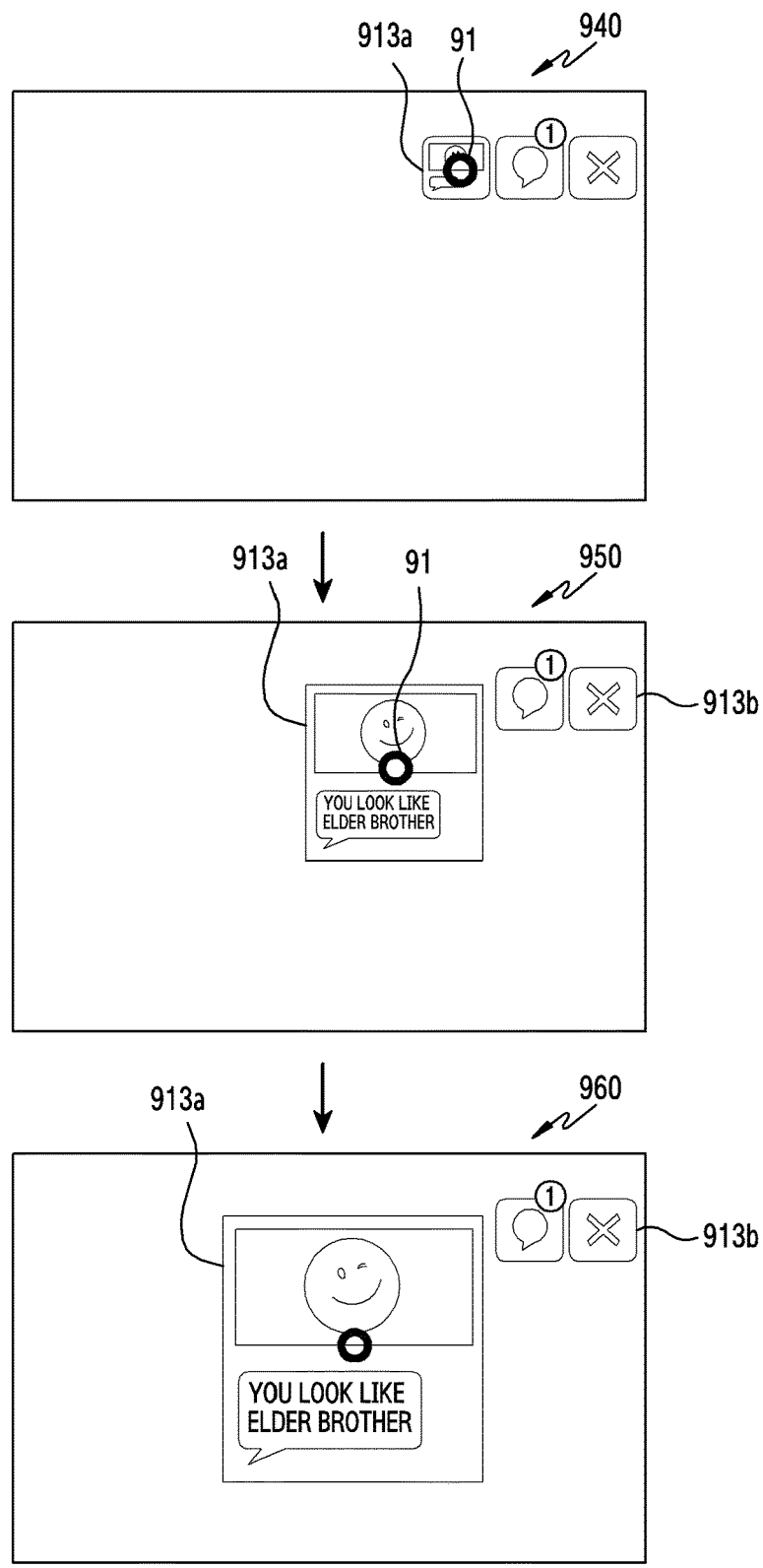
Figure 9C:
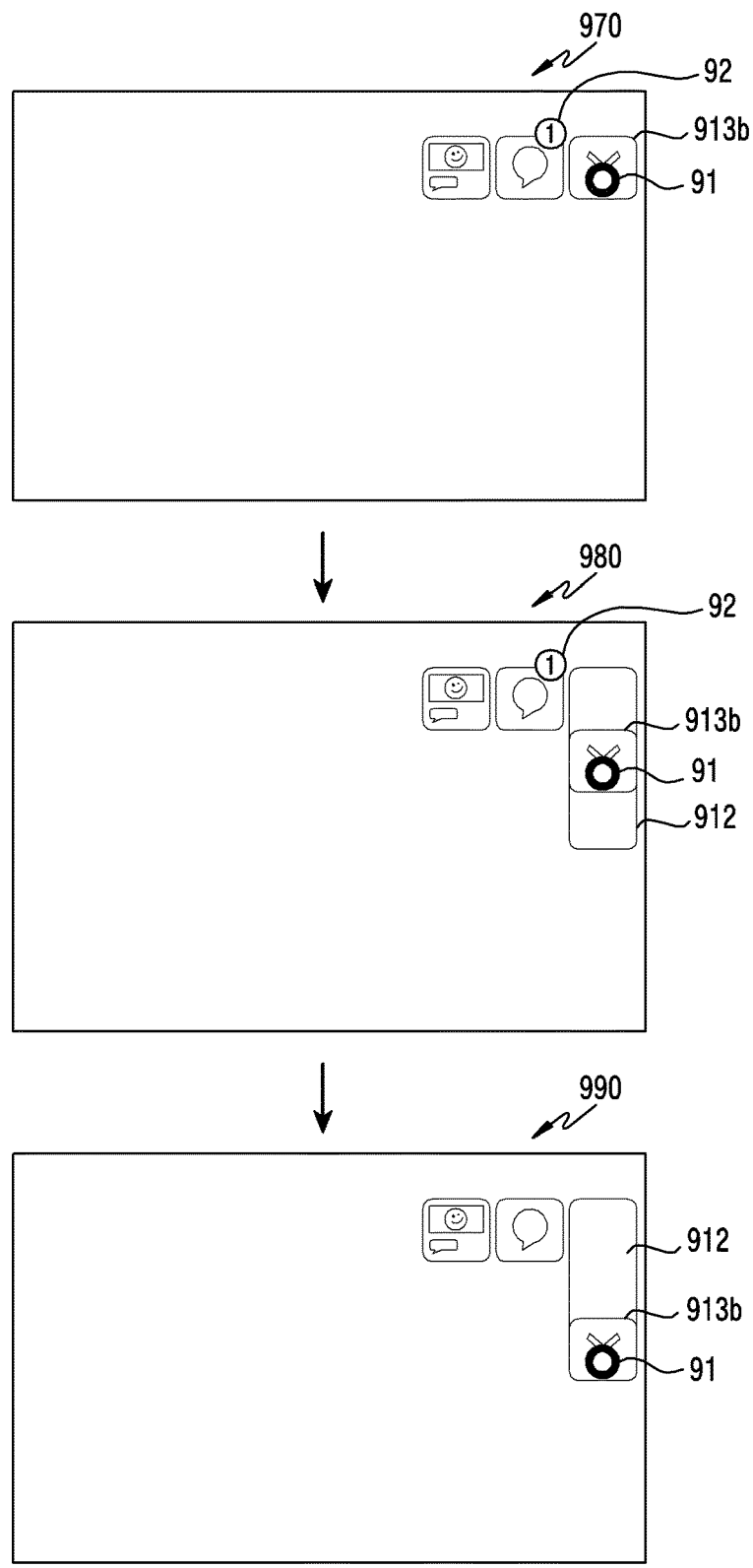

FIG. 9A to FIG. 9C are example diagrams executing an application by using sight-line direction information of an electronic device according to an embodiment of the disclosure.

Referring to FIG. 9A, the electronic device (e.g., the electronic device of FIG. 1 or the electronic device 200 of FIG. 2) according to an embodiment of the disclosure may execute a specified function according to a direction of a sight-line.

As shown in a figure of reference numeral 910, the electronic device according to an embodiment of the disclosure may display an icon 911 capable of executing an application, at one side of a display (e.g., the display device 160 of FIG. 1 or the display 230 of FIG. 2). The figure of reference numeral 910 illustrates only one icon for description convenience's sake, but an embodiment of the disclosure is not limited to this. For example, the electronic device may display a home screen (or menu screen) that includes a plurality of icons.

In response to a user's sight-line 91 being moved to the icon 911, as shown in figures of reference numerals 920 and 930, the electronic device according to an embodiment of the disclosure may display a first dynamic UI 913a and a second dynamic UI 913b related with the icon 911, around the icon 911. The first dynamic UI 913*a* may be related with a first function of an application. For example, the first dynamic UI 913*a* may be a thumbnail form of an execution screen (e.g., a chat window) of the first function. The second dynamic UI 913*b* may be related with a second function (e.g., notification stop) of the application. The figure of reference numeral 930 illustrates two dynamic UIs for description convenience's sake, but an embodiment of the disclosure is not limited to this. For example, the electronic device may display three or more dynamic UIs around the icon 911.

Referring to FIG. 9B, in response to the sight-line 91 being moved to the first dynamic UI 913*a*, as shown in figures of reference numerals 940 to 960, the electronic device according to an embodiment of the disclosure may vary the first dynamic UI 913*a* in response to the movement of the sight-line 91. For example, the electronic device may increase a size of the first dynamic UI 913*a* in response to the movement of the sight-line 91. The figures of reference numerals 940 to 960 illustrate that a transparency of the first dynamic UI 913*a* is "0", but the first dynamic UI 913*a* may be displayed semi-transparently (e.g., a transparency of 50%) until before the first function is executed. According to some embodiments, the transparency of the first dynamic UI 913*a* may be gradually decreased in response to the movement of the sight-line 91. For example, the transparency of the first dynamic UI 913*a* may be gradually decreased from 50% to 0%.

In response to the movement of the sight-line 91 satisfying a set condition, the electronic device according to an embodiment of the disclosure may execute the first function. For example, the electronic device may display a chat screen as a full screen.

According to some embodiment, while the first dynamic UI 913*a* is varied, the electronic device may not display the second dynamic UI 913*b*.

Referring to FIG. 9C, in response to the sight-line 91 being moved to the second dynamic UI 913*b*, as shown in figures of reference numerals 970 to 990, the electronic device according to an embodiment of the disclosure may display a guide UI 912, and move the second dynamic UI 913*b* along the guide UI 912 in response to the movement of the sight-line 91. According to some embodiment, the electronic device may change a color of the guide UI 912 in response to the movement of the second dynamic UI 913*b*.

In response to the movement of the sight-line 91 satisfying a set condition, the electronic device according to an embodiment of the disclosure may execute the second function. For example, as shown in the figure of reference numeral 990, by performing a notification ending function, the electronic device may eliminate an indicator 92 of notifying the existence of an unidentified message from the icon 911.

According to some embodiment, while the second dynamic UI 913*b* is varied, the electronic device may not display the first dynamic UI 913*a*.

FIG. 10A to FIG. 10G are example diagrams executing content by using sight-line information in a three-dimensional space according to an embodiment of the disclosure.

Referring to FIG. 10A to FIG. 10G; the electronic device (e.g., the electronic device 101 of FIG. 1 or the electronic device 200 of FIG. 2) according to an embodiment of the disclosure may execute content by using sight-line information in a three-dimensional space. For example, the electronic device may be a virtual reality (VR) device.

Figure 10A:
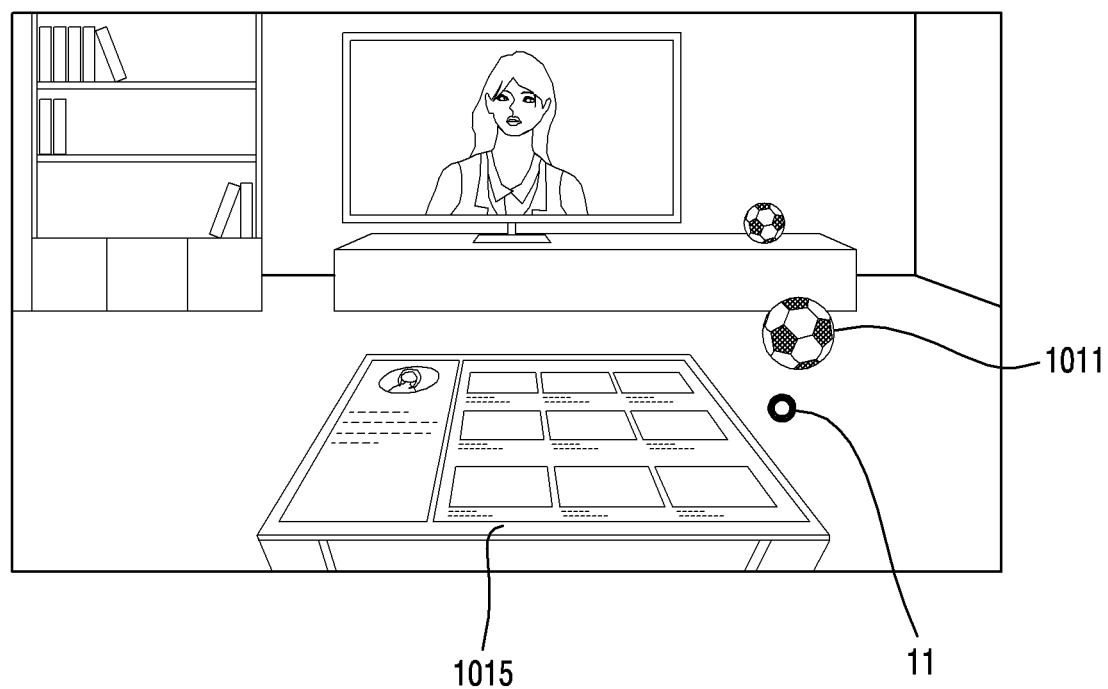
FIG. 10A to FIG. 10G are example diagrams executing content by using sight-line information in a three-dimensional space according to an embodiment of the disclosure.

The electronic device according to an embodiment of the disclosure may provide a three-dimensional screen. As shown in FIG. 10A, the three-dimensional screen may display at least one virtual object in a living room space of real world that is recognized by means of the VR device. For example, the electronic device may display a ball 1011 at one side (e.g., the air) of the three-dimensional space, and display a web browser 1015 on a table.

Figure 10B:
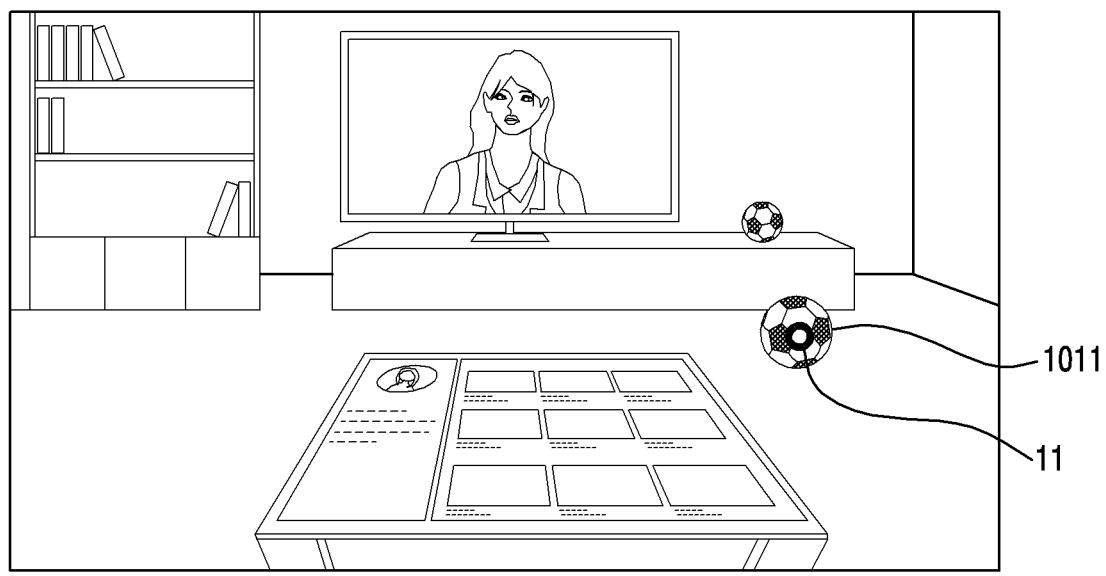
Figure 10C:
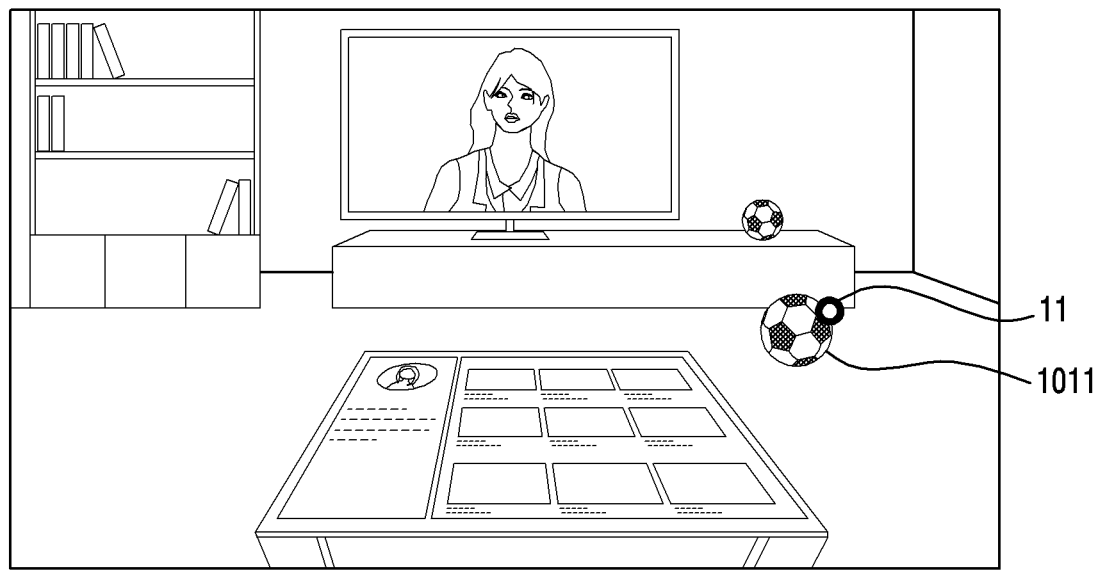

As shown in FIG. 10B and FIG. 10C, in response to a user's sight-line 11 being moved to the ball 1011, the electronic device according to an embodiment of the disclosure may move the virtual ball 1011 in a set direction (e.g., a left and lower direction). This is merely an example, and the virtual ball may be moved in various directions.

Figure 10D:
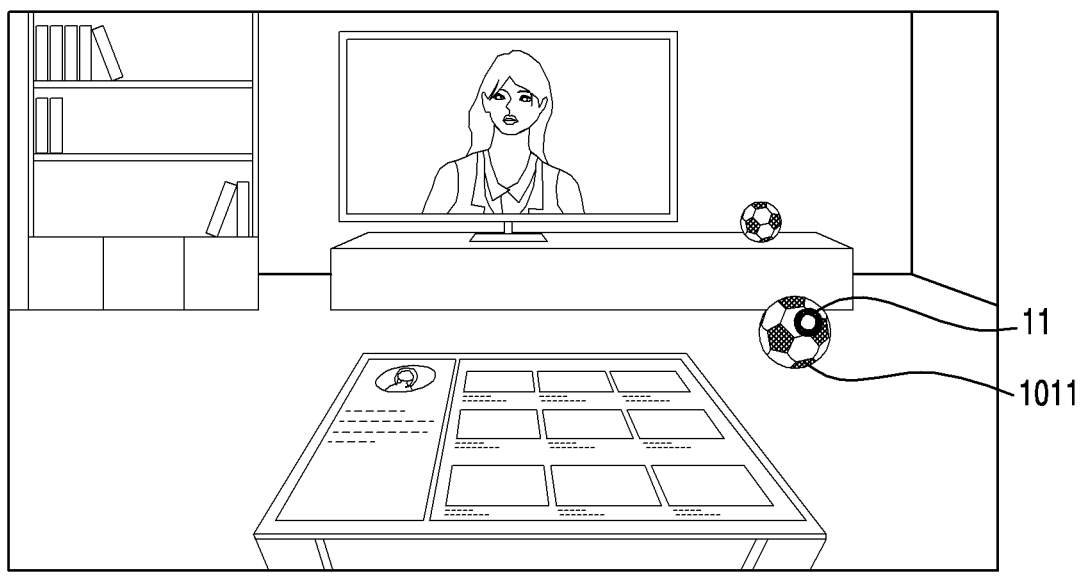
Figure 10E:
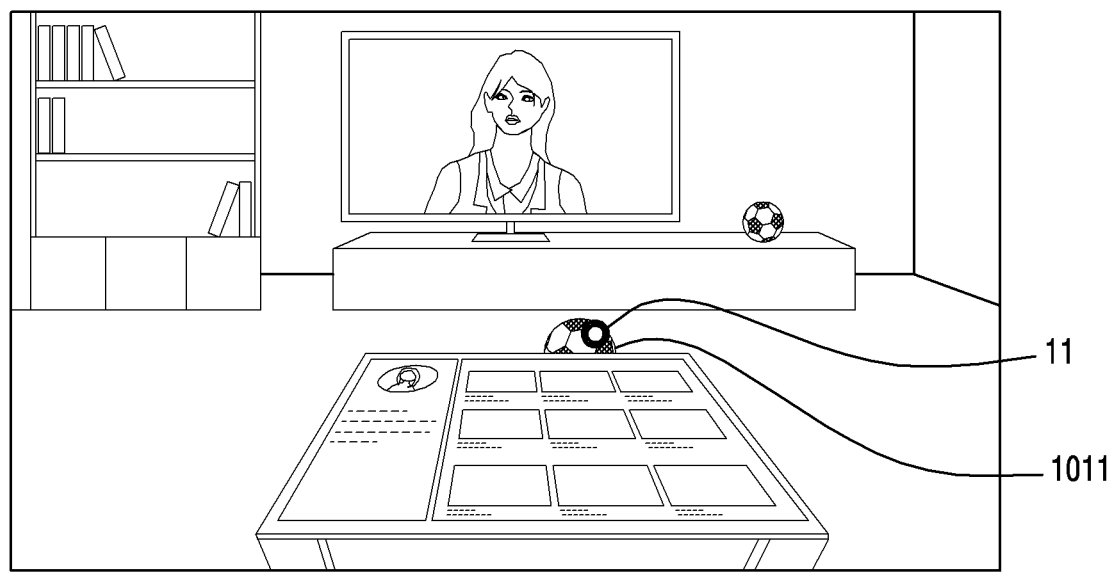

As shown in FIG. 10D and FIG. 10E, the electronic device according to an embodiment of the disclosure may move the virtual ball 1011 in a table direction in response to the movement of the sight-line 11.

Figure 10F:
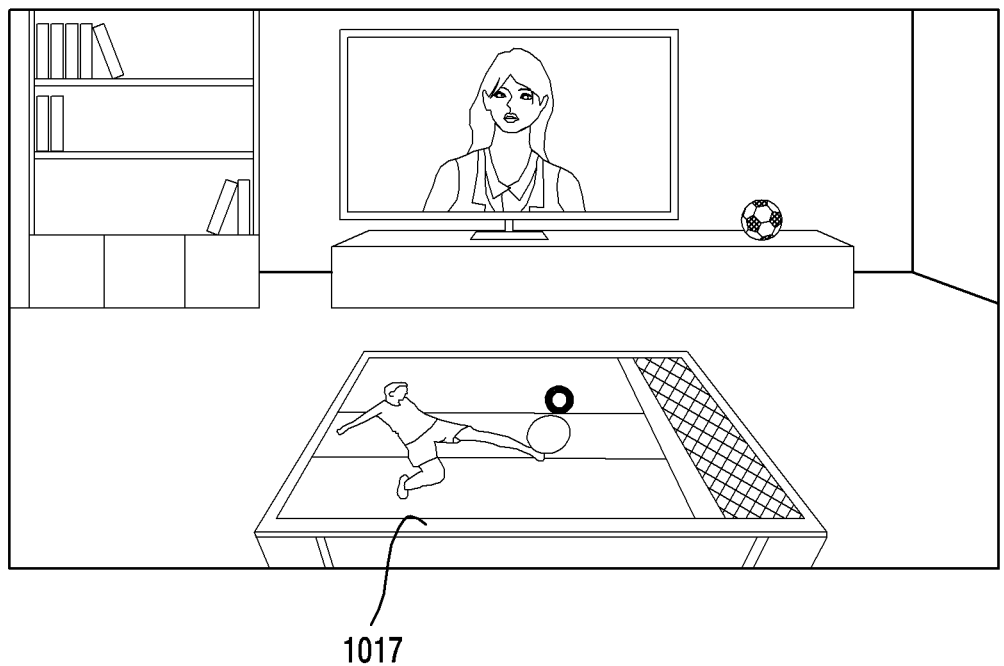

In response to the movement of the sight-line 11 satisfying a set condition, the electronic device according to an embodiment of the disclosure may execute content. For example, as shown in FIG. 10F, the electronic device may change the web browser 1015 of the table into a football game screen 1017 and output the football game screen 1017 on the table.

Figure 10G:
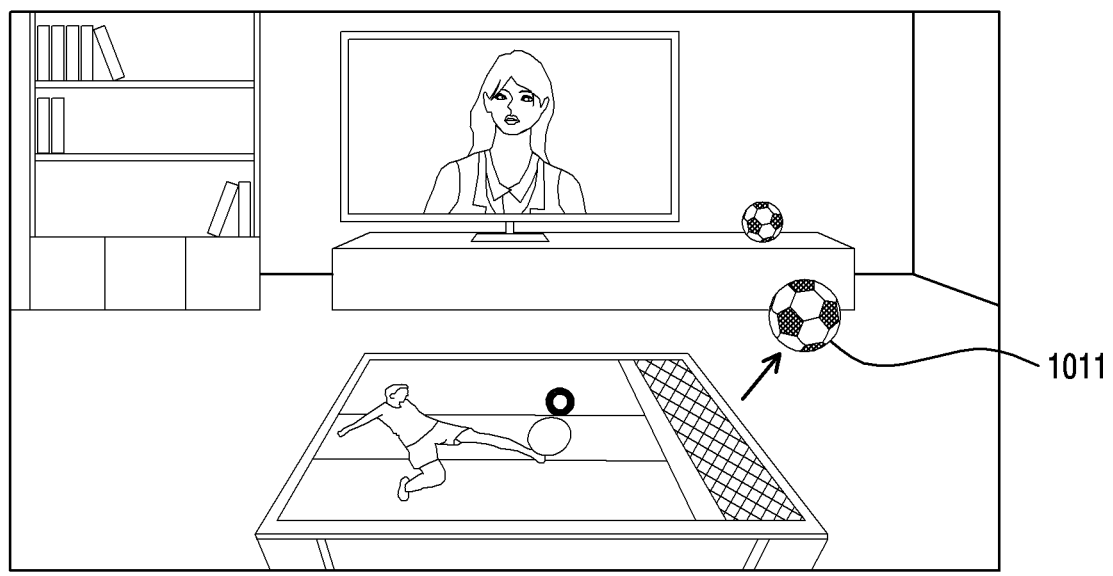

In response to the content execution being completed, as shown in FIG. 10G; the electronic device may move the ball 1011 to the original position.

According to some embodiment, instead of moving the virtual ball 1011, the electronic device may separately provide a semitransparent ball, and move the semitransparent ball in response to a sight-line movement. In this case, the operation of FIG. 10G may be omitted.

Meantime, the above description has been made in which the electronic device visually feeds back that a command of execution of content dependent on a sight-line movement is being inputted, but various embodiments of the disclosure are not limited to this. For example, the electronic device may provide an auditory feedback and/or a tactile feedback, together with a visual feedback. Or, in response to not including a display, the electronic device may provide the auditory feedback and/or the tactile feedback. For example, the electronic device may gradually increase an effect sound or gradually increase a vibration intensity according to a sight-line movement until the command of execution of the content dependent on the sight-line movement is completed. Or, the electronic device may shorten an output cycle of an effect sound or vibration according to the sight-line movement until the command of execution of the content dependent on the sight-line movement is completed.

The above description has been made in which the electronic device provides feedback information in response to a sight-line movement. However, various exemplary embodiments of the disclosure are not limited to this. For example, in another embodiment of the disclosure, the electronic device may select content through various pointing devices (e.g., a mouse, a touch, a hover, a gesture, etc.), and move the pointing devices according to a set condition, to execute the content, and feed back in a visual, auditory or tactile manner that a command of execution of the selected content is being inputted in response to the movement of the pointing devices.

Various embodiments of the disclosure may efficiently control the execution of content by using sight-line information. For example, in various embodiments of the disclosure, a user may move a sight-line fast or slowly, to control an execution speed of content. Also, various embodiments of the disclosure do not immediately cancel a command of execution of content even though the sight-line deviates temporarily and thus, may prevent an inconvenience in which, regardless of a user's intention, the content execution is canceled in response to the sight-line temporarily deviating.

Also, various embodiments of the disclosure may execute content by using only sight-line information and thus, do not require a separate input device. Also, various embodiments of the disclosure execute the content by a movement of a sight-line and thus, may solve a conventional inconvenience in which the content is executed in response to simply staring at the content without an intention to execute the content. Also, various embodiments of the disclosure may perform another function according to a movement direction of the sight-line and thus, may easily execute various functions related with content.

The electronic device according to various embodiments may be one of various types of electronic devices. The electronic devices may include, for example, at least one of a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar elements. It is to be understood that a singular form of a noun may include one or more of the things, unless the relevant context clearly indicates otherwise. As used herein, each of such phrases as "A or B," "at least one of A and/or B," "A, B, or C," or "at least one of A, B, and/or C" may include all possible combinations of the items enumerated together. As used herein, such terms as "1st," "2nd," "first" or "second" may modify corresponding components regardless of an importance or an order, be used to distinguish a component from another, and does not limit the corresponding components. It is to be understood that if an element (e.g., a first element) is referred to, "(operatively or communicatively) connected with," or "connected to" another element (e.g., a second element), it means that the element may be coupled with the other element directly, or via other element (e.g., a third element).

As used herein, the term "module" includes a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including instructions that are stored in a machine readable storage medium (e.g., internal memory 136 or external memory 138) that is readable by a machine (e.g., computer). The machine may invoke instructions stored in the storage medium, be operated to perform functions according to the instructions invoked, and include the electronic device (e.g., the electronic device 101, the electronic device 200) according to embodiments disclosed. If the instructions are executed by a processor (e.g., the processor 120, the processor 210), the processor may execute functions corresponding to the instructions directly or using other components under the control of the processor. The instructions may include a code generated or executed by a compiler or an interpreter. The machine-readable storage medium may be provided in the form of a non-transitory storage medium. Wherein, the term "non-transitory" simply means that the storage medium does not include a signal and is tangible, but does not differentiate between semi-permanently storing the data in the storage medium and temporarily storing the data in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the storage medium, such as memory of the manufacturer's server, a server of the application store, or a relay server.

According to various embodiments, each component (e.g., a module or a program) may include a single entity or multiple entities, and part of the above-described components may be omitted, or other components may be added. Alternatively or additionally, the part of components (e.g., modules or programs) may be integrated into a single component, and may still perform a function of each component in the same or similar manner as they are performed by each component before the integration. According to various embodiments, operations performed by the module, the program, or another component may be carried out sequentially, in parallel, repeatedly, or heuristically, or at least part operation may be executed in a different order or omitted, or other operations may be added.

What is claimed is:

1. An electronic device comprising:
a display;
a sight-line tracking module;
a memory storing instructions; and
at least one processor operatively coupled with the display, the sight-line tracking module and the memory,
wherein the at least one processor is, on the basis of execution of the instructions, configured to:
control the display to display at least one content;
identify a content that a user stares at among the at least one content, based on information on a user's sight-line tracked through the sight-line tracking module;
in response to a movement of the user's sight-line on the identified content being sensed, display, on the display, a dynamic user interface (UI) that is dynamically varied based on the movement of the user's sight-line, wherein the dynamic UI feeds back that a command for executing the identified content is being inputted;
in response to a path of the movement of the user's sight-line satisfying a pre-designated condition, execute the identified content;
identify whether the path of the movement of the user's sight-line deviates from a region of the dynamic UI; and
in response to the path of the movement of the user's sight-line deviating from the region of the dynamic UI, control the display to inversely vary the varied dynamic UI at a specific speed to feed back that the command for executing the identified content being inputted is canceled after elapsing a designated time.

2. The electronic device of claim 1, wherein the at least one processor is further configured to control the display to feed back that the identified content has been executed, or feed back that the command for executing the identified content has been canceled.

3. The electronic device of claim 1, wherein the pre-designated condition comprises at least one of a time of the movement of the user's sight-line, a speed of the movement of the user's sight-line, a direction of the movement of the user's sight-line or the path of the movement of the user's sight-line.

4. The electronic device of claim 1, wherein, in response to the content having been identified, the at least one processor is further configured to control the display to display at least one notification UI that feeds back that the execution of the identified content is available through the movement of the user's sight-line.

5. The electronic device of claim 4, wherein the at least one processor is further configured to display the dynamic UI by dynamically varying the at least one notification UI based on the movement of the user's sight-line.

6. The electronic device of claim 1, wherein, in response to displaying the dynamic UI, the at least one processor is further configured to control the display to further provide a guide UI of guiding the path of the movement of the user's sight-line.

7. The electronic device of claim 1, wherein the at least one processor is further configured to control the display to dynamically vary at least one of a size of the dynamic UI, a position of the dynamic UI or a transparency of the dynamic UI.

8. A method for executing content by using sight-line information of an electronic device, the method comprising:
displaying at least one content on a display;
identifying a content that a user stares at among the at least one content;
in response to a movement of a user's sight-line on the identified content being sensed, displaying, on the display, a dynamic user interface (UI) that is dynamically varied based on the movement of the user's sight-line, wherein the dynamic UI feeds back that a command for executing the identified content is being inputted;
in response to a path of the movement of the user's sight-line satisfying a pre-designated condition, executing the identified content;
identifying whether the path of the movement of the user's sight-line deviates from a region of the dynamic UI; and
in response to the path of the movement of the user's sight-line deviating from the region of the dynamic UI, inversely varying the dynamic UI at a specific speed to feed back that the command for executing the identified content being inputted is canceled after elapsing a designated time.

9. The method of claim 8, further comprising at least one of:
feeding back that the identified content has been executed by the movement of the user's sight-line; or
feeding back that the command for executing the identified content has been canceled.

10. The method of claim 8, wherein the pre-designated condition comprises at least one of a time of the movement of the user's sight-line, a speed of the movement of the user's sight-line, a direction of the movement of the user's sight-line or the path of the movement of the user's sight-line.

11. The method of claim 8, further comprising, in response to the content having been identified, displaying at least one notification UI that feeds back that the execution of the identified content is available through the movement of the user's sight-line.

12. The method of claim 8, wherein displaying the dynamic UI further comprises displaying a guide UI of guiding the path of the movement of the user's sight-line.

13. The method of claim 8, wherein displaying the dynamic UI comprises dynamically varying at least one of a size of the dynamic UI, a position of the dynamic UI or a transparency of the dynamic UI.

14. The electronic device of claim 1, wherein the at least one processor is further configured to:
resume varying the dynamic UI based on the movement of the user' sight-line, in response to the user's sight-line returning within the region of the dynamic UI before elapsing the designated time.

15. The electronic device of claim 14, wherein the at least one processor is further configured to:
cancel the command for executing the identified content being inputted, in response to the user's sight-line not returning within the region of the dynamic UI until elapsing the designated time.

16. The method of claim 8, further comprising:
identifying whether the user's sight-line returns within the region of the dynamic UI before elapsing the designated time; and
resuming varying the dynamic UI based on the movement of the user's sight-line, in response to the user's sight-line returning within the region of the dynamic UI before elapsing the designated time.

17. The method of claim 16, further comprising:
canceling the command for executing the identified content being inputted, in response to the user's sight-line not returning within the region of the dynamic UI until elapsing the designated time.

18. The method of claim 8, further comprising:
identifying whether a sight-line execution function for executing the content by using information on the user's sight-line has been activated.

* * * * *